United States Patent [19]
Kubo et al.

[11] 3,823,621
[45] July 16, 1974

[54] VEHICLE AUTOMATIC TRANSMISSION CONTROL SYSTEM

[75] Inventors: Seitoku Kubo; Teruo Akashi; Chirio Hayashi, all of Toyota, Japan

[73] Assignee: Toyota Jidosha Kogyo Kabushiki Kaisha, Toyota-shi, Japan

[22] Filed: Dec. 22, 1971

[21] Appl. No.: 210,826

[30] Foreign Application Priority Data
Dec. 27, 1970 Japan.............................. 45-126234

[52] U.S. Cl............... 74/752 A, 74/864, 74/869, 91/47, 137/596.16, 192/52, 192/103 F
[51] Int. Cl. .... F16h 47/04, F16h 5/48, F16k 31/06
[58] Field of Search.......... 74/752 A, 752 C, 752 D, 74/864, 869; 91/47; 137/596.16, 596.17; 192/103 F, 109 F

[56] References Cited
UNITED STATES PATENTS
| | | | |
|---|---|---|---|
| 2,995,957 | 8/1961 | Wilson et al. | 74/752 A |
| 3,650,161 | 3/1972 | Kubo et al. | 74/752 D |
| 3,659,631 | 5/1972 | Rakoske | 137/596.17 |
| 3,690,197 | 9/1972 | Sumiyoshi et al. | 74/752 A |

Primary Examiner—Allan D. Herrmann
Attorney, Agent, or Firm—Cushman, Darby & Cushman

[57] ABSTRACT

A control system for an automatic transmission for an automotive vehicle comprising a combination of a hydraulic control section and an electrical control section. The hydraulic control section includes a servo capacity control value connected to a plurality of hydraulic servos for controlling fluid pressure supplied to the hydraulic servos during a shift from one speed ratio to another by discharging a portion of fluid under pressure from at least one of the hydraulic servos or from an associated fluid passage into a pressure discharge port through an orifice, and the electrical control section includes means for controlling the operation of the servo capacity control valve depending on the running conditions of the vehicle. The servo capacity control valve and the electrical control means cooperate to delicately control the rate and timing of engagement and disengagement of frictional engaging means for ensuring a smooth shift.

10 Claims, 23 Drawing Figures

TIME WHEN A
SHIFT SIGNAL
IS APPLIED

DUTY CYCLE   $R = \dfrac{T_{ON}}{T}$

VEHICLE AUTOMATIC TRANSMISSION CONTROL SYSTEM

This invention relates to fluid controlled automatic transmissions for automotive vehicles and more particularly to a control system for controlling the operation of such an automatic transmission.

Fluid controlled automatic transmissions for automotive vehicles are generally provided with a planetary gear unit and a plurality of hydraulic servo actuated frictional engaging means so as to obtain a plurality of speed ratios by suitably selectively engaging and disengaging these frictional engaging means.

A change from one speed ratio to another is called a shift, and a so-called shift shock occurs during a shift due to a variation in the torque and the number of revolutions of the rotary members including the engine. In order to alleviate this shift shock and eliminate a slow or rough speed-changing motion, reviving up of the engine, etc. thereby providing a comfortable feeling during driving, it is desirable to engage and disengage the frictional engaging means with proper triming and at a suitable rate depending on the running conditions of the vehicle. Various efforts have been made heretofore for the purpose of alleviating shift shock and their objects have been partly attained, but only a few of these efforts have been successful in providing satisfactory results over the entire range of the running conditions of the vehicle.

It is therefore an object of the present invention to provide a control system for an automatic transmission for an automotive vehicle which comprises a unique combination of hydraulic and electrical control means for alleviating the undesirable shift shock and providing a comfortable feeling during driving due to the elimination of a slow and rough speed-changing motion, reviving up of the engine, etc.

The control system according to the present invention comprises a combination of a hydraulic control section and an electrical control section. The hydraulic control section includes a servo capacity control valve connected to a plurality of hydraulic servo means for controlling fluid pressure supplied to the hydraulic servo means during a shift from one speed ratio to another by discharging a portion of fluid under pressure from at least one of the hydraulic servo means or from an associated fluid passage into a pressure discharge port through an orifice, and the electrical control section includes means for causing oscillation of the servo capacity control valve and controlling the duty cycle of the oscillation depending on the running conditions of the vehicle so that the orifice acts apparently as a variable orifice. The servo capacity control valve and the electrical control means cooperate to delicately control the rate and timing of engagement and disengagement of frictional engaging means to ensure a smooth shift.

The above and other objects, features and advantages of the present invention will be apparent from the following detailed description taken in conjunction with the accompanying drawing, in which.

Figure 1:
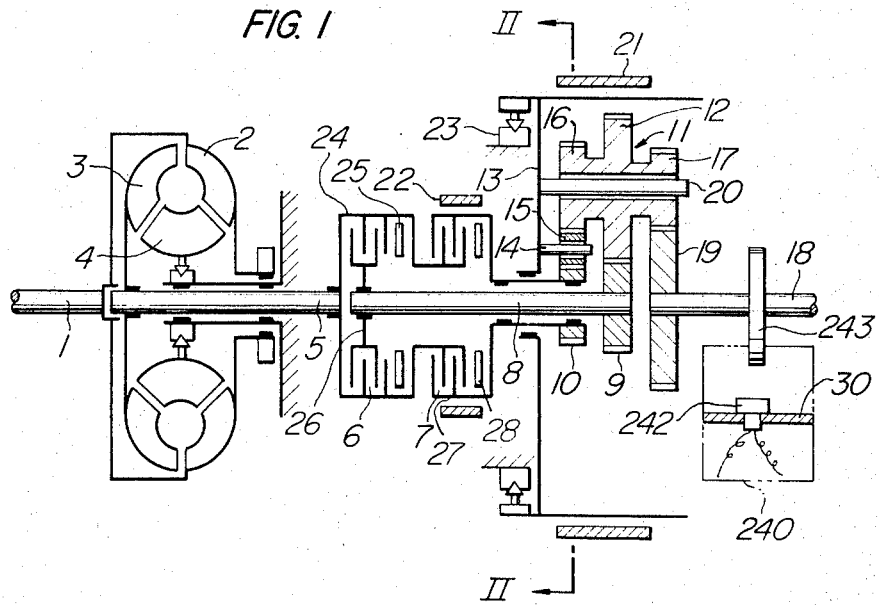
FIG. 1 is a schematic sectional view of an automatic transmission to which the present invention is applied.
Figure 2:
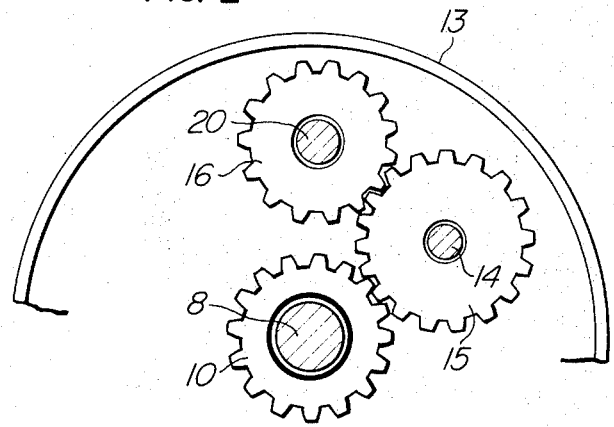
FIG. 2 is an enlarged sectional view taken on the line II — II in FIG. 1 with parts cut away to show in detail the relation between an idler gear not shown in FIG. 1 and the sun gear and planet pinion.
Figure 3:
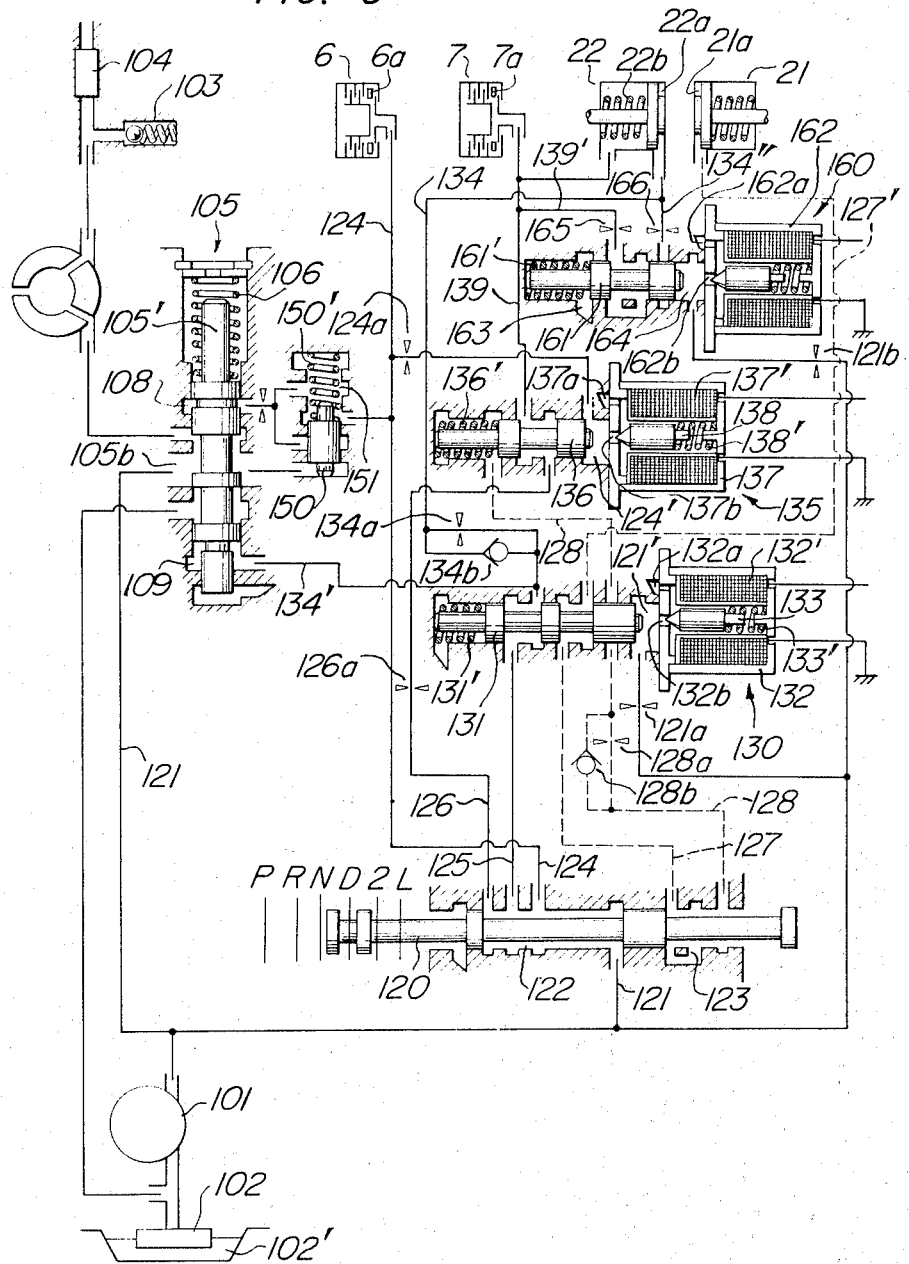
FIG. 3 is a diagrammatic view showing the structure of a hydraulic control section of a control system according to the present invention.
Figure 6:
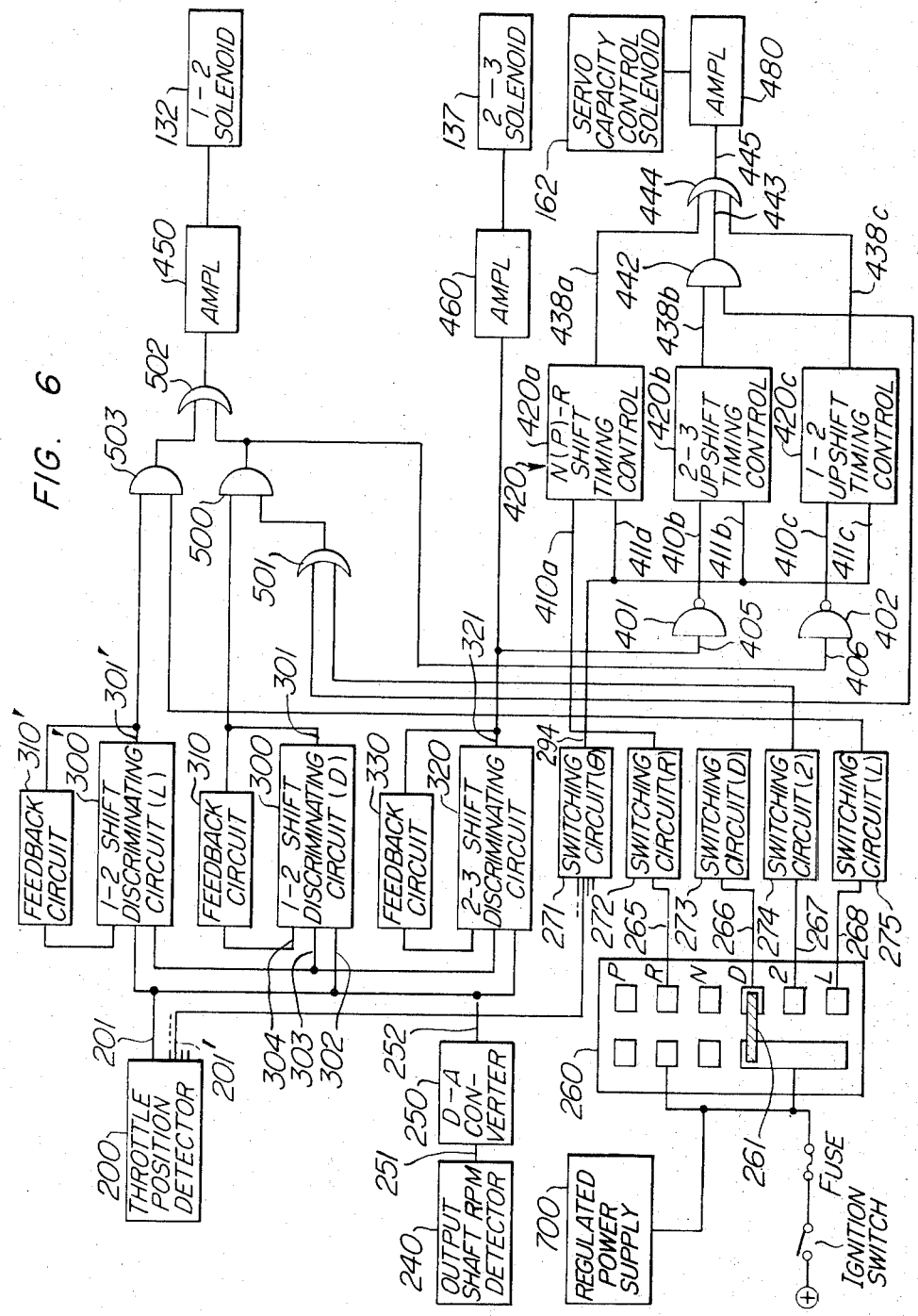
FIG. 6 is a block diagram showing the structure of an electrical control section of the control system according to the present invention.

An automatic transmission controlled by a control system embodying the present invention is schematically shown in FIGS. 1 and 2. The control system comprises a hydraulic control section as shown in FIG. 3 and an electrical control section as shown in FIG. 6.

Referring to FIGS. 1 and 2, the transmission comprises a hydraulic torque converter unit and a planetary gear unit arranged to provide three forward speeds and one reverse speed. The torque converter unit is of known construction including a pump impeller 2, a turbine impeller 3 and a stator 4. The pump impeller 2 is directly connected to the crankshaft 1 of an engine, and the turbine impeller 3 is connected to a turbine shaft 5 so that a rotational force can be transmitted to the planetary gear unit disposed at the output side of the torque converter unit. The planetary gear unit includes two multiple disc clutch means and two brake band means released and engaged by associated hydraulic servo means, a sprag type oneway clutch, and a planetary gear train composed of sun gears and planet pinions. The turbine shaft 5 is connected by means of a front clutch 6 to an intermediate shaft 8 carrying an input sun gear 9 thereon and is further connected by means of a rear clutch 7 to a reverse sun gear 10. A brake band means 22 (hereinafter to be referred to as a front brake band) encircles the rear clutch 7 for controlling the reverse sun gear 10 and is actuated by an associated hydraulic servo means. The input sun gear 9 meshes with each gear 12 of a plurality of, for example, two or three planet pinions 11. The reverse sun gear 10 meshes with idler gears 15 (shown in FIG. 2) which mesh in turn with gears 16 of the planet pinions 11. The rearmost gear 17 of each planet pinion 11 meshes with a gear 19 mounted at the front and of an output shaft 18 of the transmission. The planet pinions 11 and idler gears 15 are supported on a carrier 13 by pinion pins 20 and 14 respectively. A brake band means 21 (hereinafter to be referred to as a rear brake band) encircles the carrier 13 for locking the carrier 13 against rotation and is actuated by an associated hydraulic servo means. A sprag type one-way clutch 23 is associated with the carrier 13 for locking the carrier 13 against rotation is one direction.

With the above structure, three forward speed and one reverse speed can be obtained by selectively actuating the elements above described in a manner as follows:

First speed — The front clutch 6 and the rear brake band 21 are actuated. (However, when the transmission is driven from the engine, the rear brake band 21 may not be actuated since the one-way clutch 23 is also actuated. In this case, however, no driving force is transmitted to the engine from the output shaft 18.) With the front clutch 6 and rear brake band 21 so actuated, the rotation of the turbine shaft 5 is transmitted through the front clutch 6 to the input sun gear 9. Due to the fact that the carrier 13 is locked against rotation by the rear brake band 21, the pinion pins 20 are also held stationary and the rotation of the turbine shaft 5 is transmitted from the input sun gear 9 to the gears 12, thence through the gears 17 to the gear 19 on the output shaft 18 in a speed reduction relation thereby providing the first speed.

Second speed — The front clutch 6 is kept actuated and the front brake band 22 is actuated while releasing the rear brake band 21. Thus, the input sun gear 9 is rotated in unison with the turbine shaft 5, but the reverse sun gear 10 is not rotated due to the fact that the rear clutch drum 27 is locked against rotation by the front brake band 22. In this state, the rotation of the input sun gear 9 causes rotation of the carrier 13 in the same direction due to the reaction of the reverse sun gear 10 thereby rotating the gear 19 on the output shaft 18 at a reduced speed or second speed.

Third speed — The third speed can be obtained by engaging both the front and rear clutches 6 and 7. The input sun gear 9 and the reverse sun gear 10 are rotated in unison and the whole planetary gear system is unitarily rotated so that the turbine shaft 5 and the output shaft 18 are rotated in a 1:1 relationship.

Reverse — When reversing, the rear clutch 7 and the rear brake band 21 are actuated. The carrier 13, hence the pinion pins 14 and 20 are thereby locked against revolution, and the rotation of the turbine shaft 5 is transmitted to the gear 19 on the output shaft 18 through the rear clutch 7, reverse sun gear 10, idler gears 15 and gears 16 and 17 of the planet pinions 11 so that the output shaft 18 is rotated in the reverse direction.

The arrangement and operation of the hydraulic control section in the control system according to the present invention will be described with reference to FIG. 3. Briefly, the hydraulic control section comprises a fluid pressure source and a hydraulic actuating circuit. The hydraulic actuating circuit includes a manual valve 120, a 1 - 2 shift means 130, a 2 - 3 shift means 135, a servo capacity modulator 160 and fluid passages. The fluid pressure source includes a pump 101, a fluid strainer 102, a fluid reservoir 102', a check valve 103, a fluid cooler 104, a pressure regulator valve 105, a relay valve 150 and fluid passages. The fluid pressure source functions to supply fluid under pressure to the torque converter, to the gears for lubricating same and to the hydraulic actuating circuit.

Fluid under pressure is supplied to the hydraulic actuating circuit by the pump 101 which may be a gear pump, vane pump or any other suitable pump. The pump 101 is driven by a shaft connected directly to the engine and draws the fluid from the fluid reservoir 102' through the fluid strainer 102 to discharge the fluid under pressure into a fluid passage 121. The fluid passage 121 leads to the pressure regulator valve 105 and the manual valve 120. The pressure regulator valve 105 is of a type commonly used in automatic transmissions for automotive vehicles. The pressure regulator valve 105 includes a valve spool 105' which is disposed in the valve body and engaged at one or upper end by a spring 106. The valve spool 105' is provided with a plurality of different lands so as to carry out the fluid pressure regulation by utilizing the balance between the fluid pressures applied to spaced valve chambers 108 and 109 and the force of the spring 106. The fluid pressure regulated by the pressure regulator valve 105 is called a line pressure. The fluid pressure applied to the upper valve chamber 108 is controlled by means of the manual valve 120 and the relay valve 150, while the fluid pressure applied to the lower valve chamber 109 is controlled by the manual valve 120 and the 1 - 2 shift means 130. When now fluid under pressure is supplied to a fluid passage 124 leading out from the manual valve 120, the fluid under pressure cooperates with a spring 150' engaging a valve element 151 of the relay valve 150 to urge the valve element 151 to its lower position shown in FIG. 3 so that the pump pressure or line pressure in the fluid passage 121 is applied to the upper valve chamber 108 of the pressure regulator valve 105. When, in this state, a fluid passage 134' leading out from the 1 - 2 shift means 130 to the lower valve chamber 109 of the pressure regulated valve 105 is exhausted, a constant relatively high fluid pressure $P_{LH}$ (line pressure) is produced by the pressure regulator valve 105, and this fluid pressure is determined by the force of the spring 106 and the fluid pressure applied to the upper valve chamber 108 of the pressure regulator valve 105. When fluid under pressure is supplied to the fluid passage 134' leading out from the 1 - 2 shift means 130, a constant fluid pressure $P_{LL}$ (line pressure) lower than the fluid pressure $P_{LH}$ is produced by the pressure regulator valve 105, and this fluid pressure is determined by the force of the spring 106 and the fluid pressures applied to the upper and lower valve chambers 108 and 109 of the pressure regulator valve 105. The relay valve 150 carries out the fluid pressure regulation when the fluid passage 124 is exhausted. The pump pressure supplied to the lower valve chamber of the relay valve 150 is reduced by an amount corresponding to the force of the spring 150' and this reduced fluid pressure is applied to the upper valve chamber 108 of the pressure regulator valve 105. Accordingly, the fluid pressure produced by the pressure regulator valve 105 is increased correspondingly to be regulated to a constant fluid pressure $P_{HH}$ higher than the fluid pressure $P_{LH}$.

The fluid pressure thus regulated by the pressure regulator valve 105 is supplied to the manual valve 120. The manual valve 120 is connected with a shift lever (not shown) disposed adjacent to the driver's seat and takes one of the P, R, N, D, 2 and L positions as shown in FIG. 3. When now the manual valve 120 takes the N position, the fluid passage 121 is closed and valve chambers 122 and 123 are exhausted. In the D position of the manual valve 120, the fluid passage 121 communicates with fluid passages 124, 125 and 126 as seen in FIG. 3. The fluid passage 124 leads directly to a front clutch servo chamber 6a, and the fluid passage 125 leads to the apply side 22a of a servo for the front brake band 22 through the 1 - 2 shift means 130, while the fluid passage 126 leads to a rear clutch servo chamber 7a and to the release side 22b of the servo for the front brake band 22 through the 2 - 3 shift means 135. In the 2 position of the manual valve 120, the fluid passage 126 leading to the 2 - 3 shift means 135 is exhausted and the fluid passages 124 and 125 communicate with the fluid passage 121. In the L position of the manual valve 120, the fluid passages 125 and 126 are exhausted and the fluid passages 124 and 127 communicate with the fluid passage 121. The fluid passage 127 communicates through the 1 - 2 shift means 130 with the fluid passages 134 and 127'. The fluid passage 134 leads to the apply side 22a of the servo for the front brake band 22, while the fluid passage 127' leads to the apply side 21a of a servo for the rear brake band 21. In the R position of the manual valve 120, the fluid passages 124, 125 and 126 are exhausted and the fluid passages 127 and 128 communicate with the fluid passage 121. The fluid passage 128 leads to the rear clutch servo chamber 7a through the 2 - 3 shift means 135.

The 1 - 2 shift means 130 comprises a 1 - 2 shift valve element 131, a 1 - 2 shift solenoid 132 and a spring 131' engaging the valve element 131. The 1 - 2 shift solenoid 132 includes a plunger 133, a spring 133' and a coil 132'. Fluid under pressure is supplied from the fluid passage 121 through an orifice 121a to a chamber 121' disposed between the right-hand end of the 1 - 2 shift valve element 131 and the 1 - 2 shift solinoid 132. The 1 - 2 shift solenoid 132 is controlled by a signal applied from the electrical control section of the system. When no current is supplied to the solenoid 132, the plunger 133 is kept in its leftward or extended position by the force of the spring 133' and closes a solenoid orifice 132b so that fluid under pressure in the chamber 121' cannot escape through the orifice 132b. As a result, the 1 - 2 shift valve element 131 is urged to its leftward or retracted position by fluid pressure in the chamber 121'. On the other hand, when current is supplied to the 1 - 2 shift solenoid 132, the plunger 133 is urged to its rightward or retracted position by the electromagnetic force so that fluid under pressure in the chamber 121' is discharged into a pressure discharge port 132a through the orifice 132b. Any substantial residual pressure may not exist within the chamber 121' because the diameter of the orifice 121a is selected to be significantly smaller than that of the orifice 132b. As a result, the 1 - 2 shift valve element 131 is urged to its rightward or extended position by the force of the spring 131'.

The 2 - 3 shift means 135 comprises a 2 - 3 shift valve element 136, a spring 136' engaging the valve element 136, and a 2 - 3 shift solenoid 137. The 2 - 3 shift solenoid 137 includes a plunger 138, a spring 138' and a coil 137'. Fluid under pressure is supplied from the fluid passage 124 through an orifice 124a to a chamber 124' disposed between the right-hand end of the 2 - 3 shift valve element 136 and the 2 - 3 shift solenoid 137. The diameter of the orifice 124a is selected to be significantly smaller than that of a solenoid orifice 137b. When current is supplied to the 2 - 3 shift solenoid 137, fluid under pressure in the chamber 124' is discharged into a pressure discharge port 137a through the orifice 137b so that the 2 - 3 shift valve element 136 is urged to its rightward or extended position by the force of the spring 136'. On the other hand, when no current is supplied to the 2 - 3 shift solenoid 137, the solenoid orifice 137b is kept closed by the solenoid plunger 138 so that the 2 - 3 shift valve element 136 is urged to its leftward or retracted position by fluid pressure in the chamber 124'.

It will be seen from the above description that the hydraulic servos in the transmission are selectively actuated to determine the gear position during driving depending on the positions of the manual valve 120, 1 - 2 shift valve element 131 and 2 - 3 shift valve element 136. Table 1 shows the relation between the position of the manual valve 120, the on-off state of the 1 - 2 and 2 - 3 shift solenoids 132 and 137, the gear position during driving, and the operating state of the hydraulic servos.

TABLE 1

| Position of manual valve | 1–2 solenoid | 2–3 solenoid | Front clutch | Rear clutch | Front brake band | Rear brake band | One-way clutch |
|---|---|---|---|---|---|---|---|
| D: | | | | | | | |
| 1st speed | On | On | O | × | × | × | O |
| 2d speed | Off | On | O | × | O | × | × |
| 3d speed | Off | Off | O | O | × | × | × |
| 2: | | | | | | | |
| 1st speed | On | .......... | O | × | × | × | O |
| 2d speed | Off | .......... | O | × | O | × | × |
| L: | | | | | | | |
| 1st speed | Off | .......... | O | × | × | O | (O) |
| 2d speed | On | .......... | O | × | O | × | × |
| R | Off | Off | × | O | × | O | × |

It will be seen from Table 1 that the 1 - 2 shift solenoid 132 is on or energized in the D position-1st speed, 2 position-1st speed and L position-2nd speed and is off or de-energized in the D position-2nd speed, D position-3rd speed, 2 position-2nd speed, L position-1st speed and R position, while the 2 - 3 shift solenoid 137 is on or energized in the D position-1st speed, D position-2nd speed and is off or de-energized in the D position-3rd speed and R position. In the 2 and L positions of manual valve 120, the 2 - 3 shift solenoid 137 does not participate in the control operation since the fluid passage 126 is exhausted in such positions regardless of the energization or de-energization of the solenoid 137 and no fluid is supplied to the rear clutch servo chamber 7a or to the release side 22b of the servo for the front brake band 22. Further, in the R porisiton of the manual valve 120, the 2 - 3 shift solenoid 137 does not participate in the control operation since the fluid passage 124 is exhausted in such position thereby exhausting the chamber 124' regardless of the energization or de-energization of the solenoid 137 with the result that the 2 - 3 shift valve element 136 is urged to its rightward or extended position and the fluid passage 128 communicates with a fluid passage 139. The symbols O and X show that a specific hydraulic servo is in operation and not in operation respectively. In the L position-1st speed, the sprag type one-way clutch 23 becomes engaged upon the operation of the engine to apply a driving force to the output shaft 18 of the transmission. Further, as will be apparent from Table 1, the vehicle is running at L position-1st speed, 2 position-2nd speed and D position-3rd speed in the case in which no current is supplied to both the 1 - 2 and 2 - 3 shift solenoids 132 and 137, that is, when both these solenoids are in the off state. Thus, the vehicle can run unhindered even when no current is supplied to these solenoids due to trouble ocurring in the electrical control section of the system.

The 1 - 2 shift valve element 131 is urged to its leftward or retracted position when the manual valve 120 is in one of the L, 2 and D positions and the 1 - 2 shift solenoid 132 is in the off state. In this position of the 1 - 2 shift valve element 131, fluid under pressure is supplied from the fluid passages 134 and 134' to the lower valve chamber 109 of the pressure regulator valve 105 so that the line pressure produced by the valve 105 is the low fluid pressure $P_{LL}$. On the other hand, when the 1 - 2 shift solenoid 132 is in the on state, the lower valve chamber 109 is exhausted so that the line pressure produced by the valve 105 is the relatively high fluid pressure $P_{LH}$.

In response to the movement of the shift valve elements in the manner above described, fluid is supplied to or discharged from the apply side and release side 22a and 22b of the servo for the front brake band 22 and to or from the rear clutch servo chamber 7a to engage or disengage the brake band and clutch thereby shifting the gear position. In this case, a so-called shift shock occurs due to a variation in the torque and r.p.m. of the members of the transmission and the engine. This shift shock can be alleviated by controlling the engaging or disengaging rate (torque increasing or decreasing rate) and the engaging or disengaging timing of the clutch and brake band.

In the present invention, the servo capacity modulator 160 carries out this control. The servo capacity modulator 160 comprises a servo capacity control valve element 161, a servo capacity control solenoid 162 and a spring 161' engaging the valve element 161. The servo capacity control solenoid 162 is similar in construction to the 1 - 2 shift solenoid 132 and 2 - 3 shift solenoid 137. Fluid under pressure is supplied to a chamber 164 disposed between the right-hand end of the servo capacity control valve element 161 and the servo capacity control solenoid 162 from the fluid passage 121 through an orifice 121b. The diameter of the orifice 121b is selected to be significantly smaller than that of a solenoid orifice 162b. When current is supplied to the solenoid 162, fluid under pressure in the chamber 164 is discharged into a pressure discharge port 162a and the valve element 161 is urged to its rightward or extended position by the force of the spring 161'. On the other hand, when no current is supplied to the solenoid 162, the solenoid orifice 162b is kept closed by the solenoid plunger so that the valve element 161 is urged to its leftward or retracted position by fluid under pressure in the chamber 164. In the rightward or extended position of the valve element 161, the fluid passage 139 leading to the rear clutch servo chamber 7a and to the release side 22b of the servo for the front brake band 22 communicates with a pressure discharge port 163 through an orifice 165, and the fluid passage 134 leading to the apply side 22a of the servo for the front brake band 22 communicates with the pressure discharge port 163 through another orifice 166. On the other hand, in the leftward or retracted position of the valve element 161, the communication between the pressure discharge port 163 and the fluid passages 139 and 134 is interrupted by the valve element 161.

Figure 4:
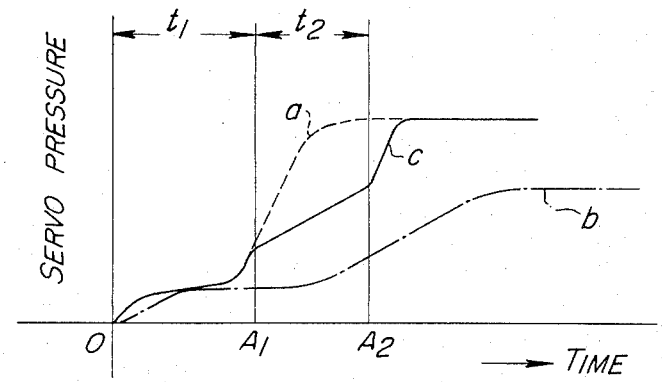
FIG. 4 is a chart showing the manner of increase relative to time of the fluid pressure supplied to the hydraulic servo means during a shift from the first to second speed when the fluid pressure is controlled by a solenoid operated servo capacity control valve.

FIG. 4 shows an increase relative to time of the servo fluid pressure or fluid pressure supplied through the fluid passage 134, to the apply side 22a of the servo for the front brake band 22 after the 1 - 2 shift valve element 131 has been moved in response to a shift signal for a shift from the first to second speed. The curve $a$ represents the rate of increase in the fluid pressure when the servo capacity control valve element 161 is kept in its leftward or retracted position. The curve $b$ represents the rate of increase in the fluid pressure when the servo capacity control valve element 161 is kept in its rightward or extended position. The curve $c$ shows a moderate rate of increase in the fluid pressure. More precisely, the servo capcity control solenoid 162 is kept in the de-energized state for a period of time $t_1$ starting from the point O until a point $A_1$ is reached. At this point $A_1$, the servo capacity control solenoid 162 is energized and is kept in such state for a period of time $t_2$ until a point $A_2$ is reached. At this point $A_2$, the servo capacity control solenoid 162 is de-energized again and is kept in such state thereafter. Thus, the servo capacity control valve element 161 is kept in the leftward or retracted position for the period of time $t_1$ and is then urged to and kept in the rightward or extended position for the period of time $t_2$, the valve element 161 being subsequently urged to the leftward or retracted position again to be kept in this position thereafter.

In the rightward or extended position of the servo capacity control valve element 161, the fluid passage 134 communicates with the pressure discharge port 163 through the orifice 166 and a portion of fluid under pressure supplied to the apply side 22a of the servo for the front brake band 22 by way of the fluid passage 134 leaks through the orifice 166. Therefore, the fluid pressure supplied to the apply side 22a of the servo for the front brake band 22 increases gradually as shown by the curve $b$ and the final fluid pressure is low compared with that shown by the curve $a$. The rate of increase represented by the curve $b$ can be varied by varying the diameter of the orifice 166. In the case of the curve $c$ in which the servo capacity control valve element 161 is kept in the rightward or extended position between the points $A_1$ and $A_2$, the fluid pressure increases initially along the curve $a$ for the period of time $t_1$, then at the rate of fluid pressure increase represented by the curve $b$ for the subsequent period of time $t_2$, and thereafter at the rate of fluid pressure increase represented by the curve $a$. Therefore, the curve $c$ can be varied freely by suitably selecting the points $A_1$ and $A_2$. The number of on-off cycles or oscillations of the servo capacity control solenoid 162 may be suitably increased so as to obtain a more complex rate of fluid pressure increase which is a suitable combination of the rates of fluid pressure increase represented by the curves $a$ and $b$.

The servo capacity control valve element 161 operates in the manner above described so as to control the rate of increase in the fluid pressure supplied to the apply side 22a of the servo for the front brake band 22. The rate of increase in the fluid pressure supplied to the release side 22b of the servo for the front brake band 22 and to the rear clutch servo chamber 7a is similarly controlled.

A shift from the first to second speed (hereinafter to be referred to as a 1 - 2 upshift) is carried out by engaging the front clutch 6 and one-way clutch 23 and then engaging the front brake band 22. In order to carry out this shift smoothly, the front brake band 22 is preferably engaged at a suitable rate. Generally, premature and abrupt engagement of the clutch and brake band results in a large shift shock and in a reduction of the service life of the linings of the clutch and brake band due to an increase in the amount of energy absorbed by the clutch and brake band linings per unit time. Also, when the clutch and brake band are engaged too late, there occurs the problems of reviving up of the engine, and uncomfortable feeling during driving and a reduction in the service life of the linings due to an increase in the amount of energy absorbed by the linings per unit time. It is therefore necessary to engage the clutch and brake band at a suitably controlled rate which is neither too early nor too late. A very smooth shift can be carried out when the abrupt increase in the torque due to the engagement of the front brake band 22 is started in the vicinity of the point $A_1$ and the engagement of the front brake band 22 is ended in the vicinity of the point $A_2$ in the curve $c$ in FIG. 4 showing the preferred rate of increase in the fluid pressure so that the torque due to the engagement of the front brake band 22 may increase gradually. If the points $A_1$ and $A_2$ cannot be maintained unchanged throughout all the driving conditions of the vehicle, these points $A_1$ and $A_2$, hence the periods of time $t_1$ and $t_2$ may be varied in response to signals representative of the driving conditions such as, for example, the engine torque, vehicle speed and temperature of lubricating oil.

In an upshift from the second to third speed (hereinafter to be referred to as a 2 - 3 upshift), the 1 - 2 shift valve element 131 is kept in its leftward or retracted position and the 2 - 3 shift valve element 136 is urged to its leftward or retracted position to release the front brake band 22 and engage the rear clutch 7. In this case, the control of the disengaging timing of the front brake band 22, the engaging timing of the rear clutch 7 and the rate of engaging the rear clutch 7 is important in order to carry out the 2 - 3 upshift smoothly.

Figure 5:
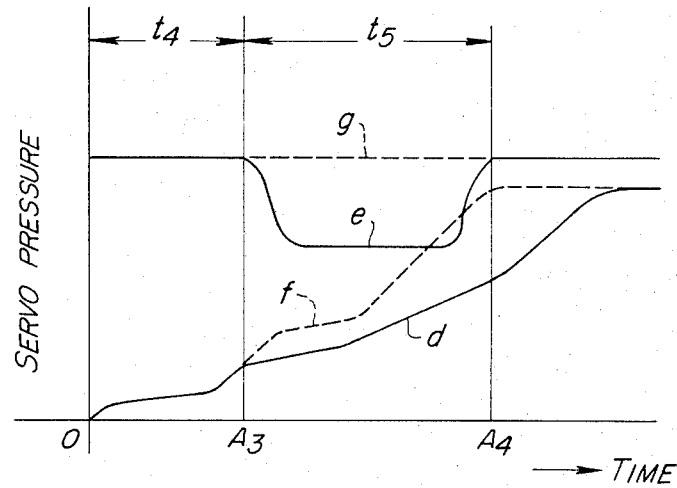
FIG. 5 is a chart showing the manner of increase relative to time of the fluid pressure supplied to the hydraulic servo means during a shift from the second to third speed when the fluid pressure is controlled by the solenoid operated servo capacity control valve.

FIG. 5 shows a variation relative to time of the servo pressure when the servo capacity control solenoid 162 is energized by an oscillating voltage and kept in such state from a point $A_3$ to a point $A_4$, hence during a period of time $t_5$ after a 2 - 3 upshift signal has been generated. The curve $d$ represents a variation in the fluid pressure supplied to the rear clutch servo chamber 7a and to the release side 22b of the servo for the front brake band 22, while the curve $e$ represents a variation in the fluid pressure supplied to the apply side 22a of the servo for the front brake band 22. The curves $f$ and $g$ shown by the broken lines represent similar variations in the fluid pressure in the state in which the servo capacity control solenoid 162 is de-energized. The curves $f$ and $g$ are shown for the purpose of comparison with the curves $d$ and $e$ respectively.

In response to the application of the oscillating voltage to the solenoid 162, a reduction takes place in the fluid under pressure supplied to the apply side 22a of the servo for the front brake band 22. Therefore, firstly, the front brake band 22 can be disengaged in a state in which a lower fluid pressure is supplied to the release V side 22b of the servo for the front brake band 22, and thus the rear clutch 7 and the front brake band 22 can be engaged and disengaged respectively with improved timing. Secondly, the fluid pressure supplied to the rear clutch servo chamber 7a increases at a gradual rate to gradually engage the rear clutch 7 so that the 2 - 3 upshift can be carried out smoothly.

A shift from the N or P position to the R position (hereinafter to be referred to as an N (or P) - R shift) can be carried out by engaging the rear brake band 21 and rear clutch 7. In order to carry out this shift smoothly, the rear clutch 7 may be engaged at a suitable rate. Thus, a smooth N (or P) - R shift can be attained by energizing the servo capacity control solenoid 162 in the manner above described.

The electrical control section of the system adapted for carrying out various kinds of control as above described by selectively controlling the solenoids 132, 137 and 162 will be described with reference to FIG. 6.

Referring to FIG. 6, the electrical control section comprises a throttle position detector 200 and an output shaft r.p.m. detector 240 for detecting the parameters required for shift control and fluid pressure control; a 1 - 2 shift discriminating circuit (D) 300, a 1 - 2 shift discriminating circuit (L) 300', and a 2 - 3 shift discriminating circuit 320 for carrying out necessary computations on the signals supplied from the detectors, and feedback circuits 310, 310' and 330 associated with the respective discriminating circuits 300, 300' and 320; a timing controller 420 including an N (or P) - R shift timing control circuit 420a, a 2 - 3 upshift timing control circuit 420b, and a 1 - 2 upshift timing control circuit 420c for controlling the servo capacity control solenoid 162 thereby alleviating the shift shock; amplifiers 450, 460 and 480 for amplifying the output signals of an OR circuit 502, 2 - 3 shift discriminating circuit 320 and timing controller 420 to a level enough to energize the respective solenoids 132, 137 and 162; a shift position switch 260; and a regulated power supply 700. The positive terminal of a power source or battery is connected through an ignition switch and a fuse to the regulated power supply 700 which distributes the power to the circuits above described by regulating the battery voltage to a voltage level required for the control of these circuits.

The shift position switch 260 comprises a movable contact strip 261 arranged for interlocking operation with the shift lever disposed adjacent to the driver's seat and a plurality of stationary contacts, and the battery voltage appears at output leads 265, 266, 267 and 268 depending on the R, D, 2 and L positions respectively of the manual valve 120.

Figure 7:
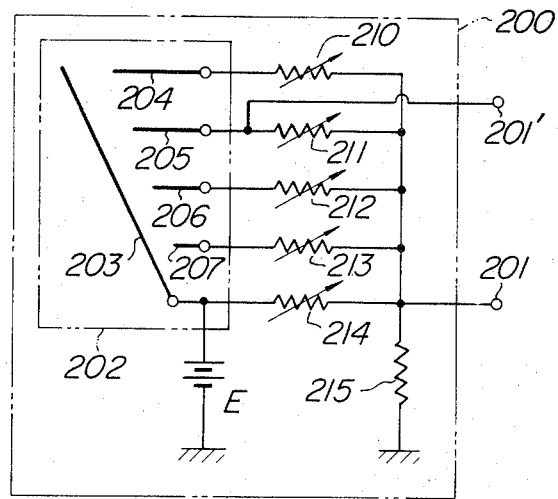
FIG. 7 is a circuit diagram showing the structure of a throttle position detector preferably used in the electrical control section.

The throttle position detector 200 has a structure as shown in FIG. 7. The throttle position detector 200 includes a throttle position detecting means 202 in the form of a multi-contact switch which is responsive to the positive of the throttle valve in the carburetor or responsive to the actuation of the accelerator pedal. This switch may respond to a mechanical displacement representative of the negative pressure in the air intake manifold inasmuch as it is an engine torque responsive signal detecting means. The multi-contact switch 202 is provided with a movable contact 203 and a plurality of stationary contacts 204, 205, 206 and 207 and is so constructed that the movable contact 203 is successively brought into contact with the stationary contacts 204, 205, 206 and 207 as the opening $S_e$ of the throttle valve is successively increased to $S_{e(1)}$, $S_{e(2)}$, $S_{e(3)}$ and $S_{e(4)}$. The stationary contacts 204, 205, 206 and 207 and the movable contact 203 are connected with one end of variable resistors 210, 211, 212, 213 and 214 respectively. The stationary contact 205 is further connected with an output terminal 201' and the movable contact 203 is connected with the power supply of voltage $E$ volts. The variable resistors 210, 211, 212, 213 and 214 are grounded at the other end through a resistor 215, and the junction point between these variable resistors and the resistor 215 is connected with an output terminal 201. The variable resistor 214 is so adjusted that a voltage $E_{(0)}$ appears at the output terminal 201 when $S_e = S_{e(0)}$ due to the full closure of the throttle valve in the carburetor. Then, when the throttle valve opening $S_e$ is increased to $S_{e(1)}$, the movable contact 203 engages solely with the stationary contact 204. The variable resistor 210 is so adjusted that the output appearing at the output terminal 201 in such a position of the switch 202 is given by $R/R_1 /\!/ R_5 + R \cdot E = E_{(1)}$, where $R$, $R_1$ and $R_5$ are the resistances of the resistor 215, variable resistor 210 and variable resistor 214 respectively and $R_1 /\!/ R_5$ is the resistance given when the variable resistors 210 and 214 are connected in the circuit in parallel with each other. Similarly, the variable resistors 211, 212 and 213 are so adjusted that the outputs appearing at the output terminal 201 in response to the throttle valve openings of $S_{e(2)}$, $S_{e(3)}$ and $S_{e(4)}$ are given by $E_{(2)}$, $E_{(3)}$ and $E_{(4)}$ respectively. Thus, the voltages $E_{(0)}$, $E_{(1)}$, $E_{(2)}$, $E_{(3)}$ and $E_{(4)}$ appear at the output terminal 201 in response to the throttle valve opening $S_e$ of $S_{e(0)}$, $S_{e(1)}$, $S_{e(2)}$, $S_{e(3)}$ and $S_{e(4)}$ respectively. In other words, a stepped signal voltage $E_{(N)}$ ($N = 0, 1, 2, 3, 4$) appears at the output terminal 201 depending on the throttle valve opening. This signal voltage is called hereinafter a throttle position signal $E_\theta$. The switch 202 is shown as having four stationary contacts, but it is apparent that the number of stationary contacts may be increased when it is desired to obtain a more complex stepped signal.

The voltage $E$ appears at the output terminal 201' when the throttle valve opening $S_e$ is $S_{e(2)}$ and over. This voltage is called hereinafter a preset throttle openning signal.

Figure 8A:
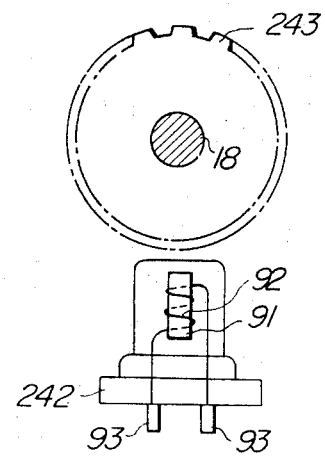
FIGS. 8a and 8b are a side elevational view and a front elevational view respectively of an output shaft r.p.m. detector preferably used in the electrical control section.
Figure 8B:
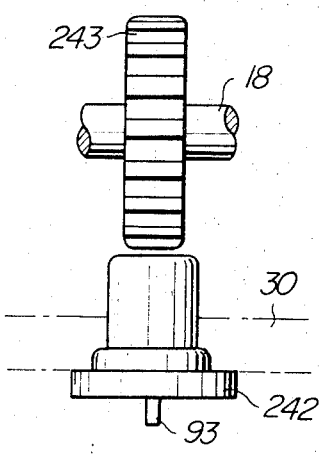

The output shaft r.p.m. detector 240 is connected to a D - A converter 250. The structure and operation of the output shaft r.p.m. detector 240 will be described with reference to FIGS. 8a and 8b. The output shaft r.p.m. detector 240 comprises an r.p.m. detecting means 242 mounted on the transmission housing 30 and a toothed disc 243 secured to the output shaft 18 of the transmission. Suppose that the number of teeth of the toothed disc 243 is $N$, then the r.p.m. detecting means 242 detects an a.c. voltage signal $S$ having a frequency which is N times the number of revolutions n of the output shaft 18. Thus, $S = n \times N$. Knowing the number of revolutions n of the output shaft 18 enables the speed of the vehicle to be known. As seen in a side elevation in FIG. 8a, the toothed disc 243 which is secured at its center of rotation to the output shaft 18 is a plate of magnetic material having N equally spaced teeth formed along its circumference, and the r.p.m. detecting means 242 is mounted on the transmission housing 30 at a position closely adjacent to the toothed disc 243 in the diametral direction of the latter. The r.p.m. detecting means 242 is composed of a permanent magnet 91 and a coil 92 wound around the magnet 91. The permanent magnet 91 and the coil 92 are housed within a suitable casing of non-magnetic material and the casing is mounted on the transmission housing 30 so that one end of the permanent magnet 91 is disposed in close proximity to the outer periphery of the toothed disc 243. As the tooth portion of the toothed disc 243 passes through the magnetic field of the permanent magnet 91 due to the rotation of the toothed disc 243, a variation takes place in the leakage flux of the permanent magnet 91 so that an electromotive force is produced in the coil 92. One complete rotation of the toothed disc 243 produces $N$ voltage pulses, and as described previously, a voltage signal at an a.c. voltage S having a frequency $n \times N$ is obtained when the output shaft 18 rotates at the number of revolutions n per unit time. This voltage signal appears across output terminals 93. It will be apparent for those skilled in the art that the detection of the speed of the vehicle can be attained by various other methods including mounting a small-sized generator in coaxial relation with the driven gear connected to the speed meter and detecting the output from the generator.

Figure 9:
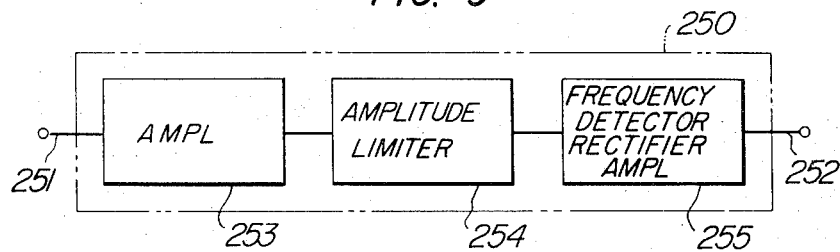
FIG. 9 is a block diagram showing the structure of a D - A converter preferably used in the electrical control section and connected with the output shaft r.p.m. detector for delivering a signal representative of the r.p.m. of the output shaft.

The output voltage signal S delivered from the output shaft r.p.m. detector 240 is applied to the D - A converter 250 by a lead 251. The D - A converter 250 converts the a.c. signal or digital signal S into a d.c. signal or analog signal. The D - A converter 250 has a structure as shown in FIG. 9. The input voltage signal S is applied by the lead 251 to an amplifier 253 in which the amplitude of the signal is increased. An amplitude limiter 254 converts the input signal into a rectangular waveform signal having a fixed amplitude. A frequency detecting, rectifying and amplifying circuit 255 converts the rectangular waveform signal into a d.c. voltage of a level proportional to the frequency. This d.c. voltage is proportional to the r.p.m. of the output shaft 18 and will hereinafter be called an output shaft r.p.m. signal or vehicle speed signal $E_n$. This signal $E_n$ is led out by a lead 252.

Figure 10:
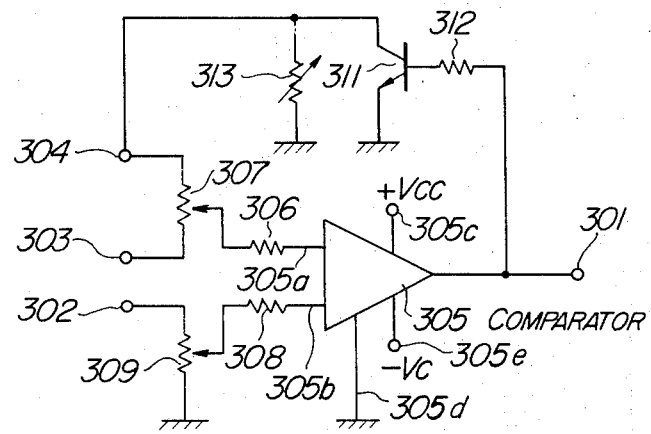
FIG. 10 is a circuit diagram showing the structure of a discriminating circuit and an associated feedback circuit preferably used in the electrical control section for generating a shift control signal.

The 1 - 2 shift discriminating circuit (D) 300 and the associated feedback circuit 310 have a structure as shown in FIG. 10. The discriminating circuit 300 includes a comparator 305 of any suitable type presently commercially available such as those sold under the trade name of $\mu$Pc 71 by Nippon Electric Co., Ltd. or of SN72710N by Texas Instruments Incorporated. An input resistor 306 is connected at one end to one of the input terminals 305a of the comparator 305 and at the other end to the movable arm of a variable resistor 307. The variable resistor 307 is connected across the input terminals 303 and 304 of the discriminating circuit 300. An input resistor 308 is connected at one end to the other input terminal 305b of the comparator 305 and at the other end to the movable arm of a variable resistor 309. The variable resistor 309 is connected at one end to another input terminal 302 of the discriminating circuit 300 and is grounded at the other end. Terminals 305c, 305d and 305e connect the comparator 305 to the positive terminal of the power supply, to ground and to the negative terminal of the power supply respectively. The feedback circuit 310 is composed of a transistor 311, a resistor 312 and a variable resistor 313. The transistor 311 has its emitter grounded and its base connected to the output lead 301 of the discriminating circuit 300 through the resistor 312. The collector of the transistor 311 is connected to one end of the variable resistor 313, and this junction point is connected to the input terminal 304 of the discriminating circuit 300. The movable arm of the variable resistor 313 is grounded.

In operation, assuming that a voltage or "1" appears on the output lead 301 when no signal is applied to the input terminals 302 and 303 of the discriminating circuit 300, the transistor 311 in the feedback circuit 310 is conducting due to the supply of base current through the resistor 312 and the input terminal 304 is substantially grounded. Then, when an output shaft r.p.m. signal $E_n$ and a throttle position signal $E_\theta$ are applied to the respective input terminals 303 and 302 of the discriminating circuit 300, a voltage $E_n' = R_b/R_a + R_b \cdot E_n$ appears at the movable arm of the variable resistor 307, where $R_a$ is the resistance between the input terminal 303 and the movable arm of the variable resistor 307, and $R_b$ is the resistance between the movable arm of the variable resistor 307 and the collector of transistor 311 in the feedback circuit 310. A voltage $E_\theta' = R_e/R_d + R_e \cdot E_\theta$ appears at the movable arm of the variable resistor 309, where $R_d$ is the resistance between the input terminal 302 and the movable arm of the variable resistor 309, and $R_e$ is the resistance between the movable arm of the variable resistor 309 and ground. Thus, the voltage $E_n'$ is applied to the input terminal 305a of the comparator 305 through the input resistor 306, and the voltage $E_\theta'$ is applied to the input terminal 305b of the comparator 305 through the input resistor 308. The comparator 305 compares the voltage $E_\theta'$ with the voltage $E_n'$. When $E_n' - E_\theta'$ is positive, no output signal or "0" is delivered from the comparator 305, while when $E_n' - E_\theta'$ is negative, an output signal or "1" is delivered from the comparator 305 to appear on the output lead 301. The resistors 306 and 308 are protective resistors which protect the comparator 305 against excessive inputs that may be applied to the input terminals.

Figure 11:
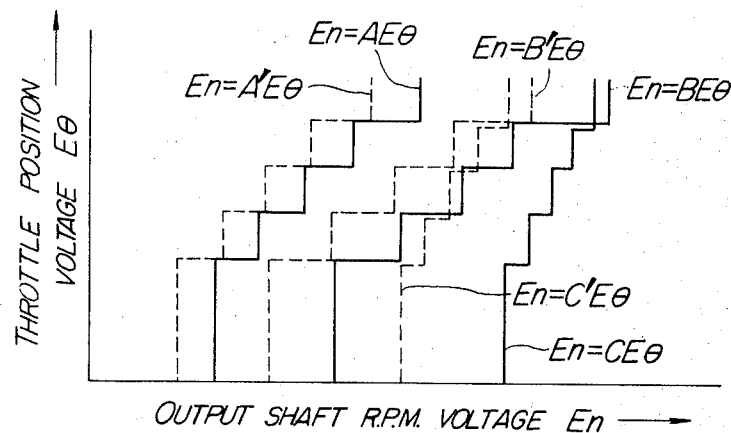
FIG. 11 is a chart showing the relation between the output shaft r.p.m. signal and the throttle position signal depending on which the output from the discriminating circuit is determined.

When no output signal or "0" appears on the output lead 301 of the discriminating circuit 300, due to $E_n' - E_\theta' > 0$, no base current is supplied to the transistor 311 through the resistor 312 in the feedback circuit 310 and the transistor 311 is cut off. In this case, a voltage $E_n'' = R_b + R_c/R_a + R_b + R_c \cdot E_n$ is applied to the input terminal 305a of the comparator 305, where $R_c$ is the resistance of the variable resistor 313. Thus, $E'' > E_n'$ for the same value of $E_n$. It will be understood therefore that the output appearing on the output lead 301 of the comparator 305 changes from 0 to 1 at a lower value of $E_n$ or at a lower vehicle speed than when the output changes from 1 to 0. In other words, the feedback circuit 310 acts to vary the degree of modification of the output shaft r.p.m. signal $E_n$ by the resistors depending on the appearance of 0 or 1 on the output lead 301 of the discriminating circuit 300 thereby varying the conditions of discrimination by the discriminating circuit 300. This method is effective in stabilizing the signal appearing on the output lead 301 and to prevent undesirable hunting between 0 and 1. By suitably selecting the resistances of the variable resistors 307, 309 and 313 in the 1 - 2 shift discriminating circuit (D) 300 and the associated feedback circuit 310, it is possible to seek the relation $E_n = AE_\theta$ between the output shaft r.p.m. signal $E_n$ and the throttle position signal $E_\theta$ when the output appearing on the output lead 301 changes from 1 to 0, and also the relation $E_n = A'E_\theta$ between these two signals when the output appearing on the output lead 301 changes from 0 to 1. These relations are shown in FIG. 11. It will be seen from FIG. 11 that the output appearing on the output lead 301 changes from 1 to 0 or no output voltage appears on the output lead 301 when $E_n$ is increased to make a shift into the region on the right-hand side of the line representing the relation $E_n = AE_\theta$. The output appears on the output lead 301 again when $E_n$ is decreased while 0 is appearing on the output lead 301 to such an extent that the relation $E_n \leq A'E_\theta$ holds.

The output signal delivered from the discriminating circuit 300 is applied as one of the input signals to an AND circuit 500 which receives another input signal from an OR circuit 501. A switching signal (D) 273 applies its output signal to one of the two input terminals of the OR circuit 501, while a switching circuit (2) 274 applied its output signal to the other input terminal of the OR circuit 501. These switching circuits 273 and 274 are switching relays employing transistors therein and deliver an output signal or 1 when the shift lever actuating the manual valve 120, hence the shift position switch 260 takes its D and 2 positions respectively. These switching circuits 273 and 274 deliver no output signal or 0 in the other positions of the shift position switch 260. Thus, the OR circuit 501 delivers an output signal or 1 in the D and 2 positions while it delivers no output signal or 0 in the other positions of the shift position switch 260. Therefore, the AND circuit 500 delivers an output signal or 1 in response to the application of 1 from the 1 - 2 discriminating circuit (D) 300 in the D and 2 positions only of the shift position switch 260, and this output signal is applied through an OR circuit 502 to the amplifier 450, thence to the 1 - 2 shift solenoid 132 for energizing same. The AND circuit 500 and the OR circuits 501 and 502 are of the construction wellknown in the art, and the amplifier 450 amplifies the output signal of the OR circuit 502 to a level enough to energize the 1 - 2 shift solenoid 132.

The 1 - 2 shift discriminating circuit (L) 300' and the associated feedback circuit 310' have a structure and function similar to those of the 1 - 2 shift discriminating circuit (D) 300 and the associated feedback circuit 310. However, the input terminals of the discriminating circuit 300' receiving the throttle position signal $E$ and the output shaft r.p.m. signal $E_n$ are reversed from the case of the discriminating circuit 300 so as to seek the relation $E_n = CE_\theta$ between these two signals when the output appearing on the output lead 301' changes from 0 to 1 and the relation $E_n = C'E_\theta$ between these two signals when the output appearing on the output lead 301' changes from 1 to 0. These relations are also shown in FIG. 11. Thus, the 1 - 2 shift discriminating circuit (L) 300' delivers an output signal or 1 when $E_n \geq CE_\theta$, whereas the 1 - 2 shift discriminating circuit (D) 300 delivers no output signal or 0 when $E_n \geq AE_4$. The output signal delivered from the 1 - 2 shift discriminating circuit 300' is applied as one of the inputs to an AND circuit 503 of known construction which receives another input signal from a switching circuit (L) 275. The switching circuit (L) 275 delivers an output signal or 1 in the L position of the transmission shift lever and no output signal or 0 in any other positions of the shift lever. It will be understood that the 1 - 2 shift discriminating circuit (L) 300' delivers an output signal or 1 when $E_n \geq CE_\theta$ and the switching circuit (L) 275 delivers and output signal or 1 in the L position of the shift lever only. In response to the application of these two signals, the AND circuit 503 delivers an output signal or 1. This signal is applied to the amplifier 450 through the OR circuit 502 for energizing the 1 - 2 shift solenoid 132. It will be seen that two discriminating circuits are provided to produce the signal for energizing the 1 - 2 shift solenoid 132 in the different positions of the transmission shift lever. These two discriminating circuits are required so that the 1 - 2 shift solenoid 132 is on in the D position-1st speed, 2 position-1st speed and L position -2nd speed and off in the D position-2nd speed, 2 position-2nd speed and L position-1st speed as shown in Table 1. However, it is apparent that any other suitable means may be provided to reverse the on and off states of the 1 - 2 shift solenoid 132 in the first and second speeds in the manner above described. According to the present invention, the range of the first speed in the D and 2 positions can be varied greatly from the range of the first speed in the L position as seen in FIG. 11 by virtue of the provision of the two discriminating circuits.

The function of the 2 - 3 shift discriminating circuit 320 and the associated feedback circuit 330 is similar to that of the 1 - 2 shift discriminating circuit (D) 300 and the associated feedback circuit 310 described previously. The 2 - 3 shift discriminating circuit 320 computes the relation $E_n = BE_\theta$ (FIG. 11) between the output shift r.p.m. signal $E_n$ and the throttle position signal $E_\theta$ when the output appearing on the output lead 321 changes from 1 to 0 and the relation $E_n = B'E_\theta$ (FIG. 11) between these two signals when the output appearing on the output lead 321 changes from 0 to 1. The output signal having appeared on the output lead 321 disappears or changes from 1 to 0 when the output shaft r.p.m. signal $E_n$ is increased to such an extent that the relation $E_n \geq BE_\theta$ is now satisfied. The output signal appears on the output lead 321 again or changes from 0 to 1 when the output shaft r.p.m. signal $E_n$ is decreased to such an extent that the relation $E_n \leq B'E_\theta$ is now satisfied. The output signal or 1 delivered from the 2 - 3 shift discriminating circuit 320 is applied to the amplifier 460 for energizing the 2 - 3 shift solenoid 137.

The servo capacity control solenoid 162 for carrying out the shift shock alleviating action which is an important feature of the present invention is controlled by the timing controller 420 which is composed of a plurality of shift timing control circuits 420a to 420c each having a delay circuit therein, an AND circuit 442, and an OR circuit 444. As described in detail in the description relating to the hydraulic control section of the system, the servo capacity control solenoid 162 controls the rate of fluid pressure supply to the hydraulic servos during a shift so as to alleviate the shock caused by the shift and operates for a limited period of time during the N (or P) - R shift, 2 - 3 upshift and 1 - 2 upshift. The operation of the timing controller 420 for producing a signal for energizing the servo capacity control solenoid 162 for a limited period of time will now be described.

N (or P) - R Shift

Figure 12:
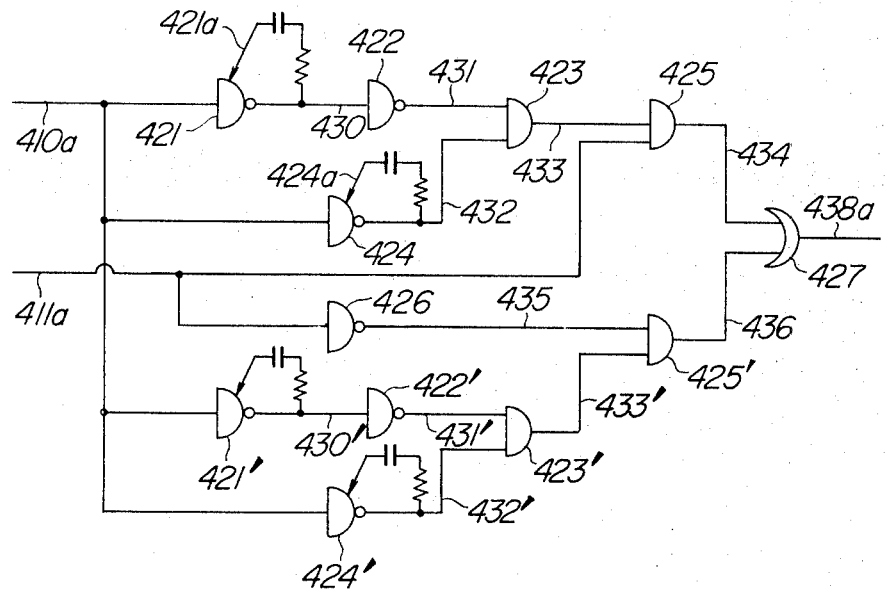
FIG. 12 is a circuit diagram showing the structure of a timing control circuit preferably used in the electrical control section.
Figure 13:
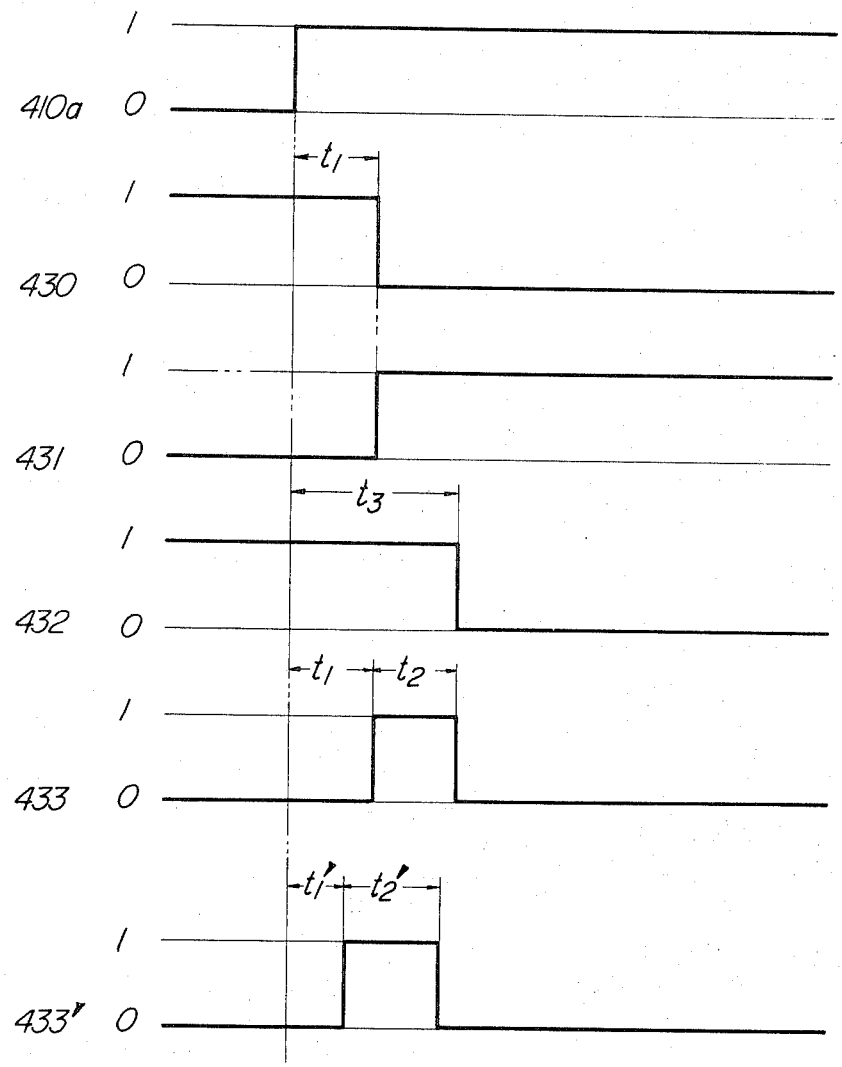
FIG. 13 is a graphic illustration of input and output waveforms appearing at various parts of the timing control circuit.

FIG. 12 shows the structure of the N (or P) - R shift timing control circuit 420a which controls the shift shock alleviating action of the servo capacity control solenoid 162 during a shift of the shift lever from the N or P position to the R position. A switching circuit (R) 272 applies its output to one of the input terminals of the timing control circuit 420a by a lead 410a. The switching circuit (R) 272 is a transistor switching relay of well-known construction and delivers an output signal or 1 when the shift lever is in the R position, while it delivers no output signal or 0 in any other positions of the shift lever. A switching circuit ($\theta$) 271 applies its output to the other input terminal of the timing control circuit 420a by a lead 411a. The switching circuit ($\theta$) 271 operates in response to the application of the output signal or preset throttle openning signal from the output terminal 201' of the throttle position detector 200 and delivers an output signal or 1 when the throttle openning is $S_{e(2)}$ and over, while it delivers no output signal or 0 when the throttle openning is less than $S_{e(2)}$. The timing control circuit 420a includes a NAND circuit 421 provided with an expander terminal 421a to which a delay circuit of well-known construction composed of a capacitor and a resistor is connected. Thus, the signal appearing on an output lead 430 leading out from the output terminal of the NAND circuit 421 changes from 1 to 0 with a delay time $t_1$ as shown in FIG. 13 relative to a change from 0 to 1 in the input applied to the input terminal by the lead 410a due to the N (or P) - R shift. An output signal or 1 appears on an output lead 431 leading out from the output terminal of a NAND circuit 422 when the output signal applied from the NAND circuit 421 changes from 1 to 0. A NAND circuit 424 having an expander terminal 424a is similar to the NAND circuit 421. Thus, the signal appearing on an output lead 432 leading out from the output terminal of the NAND circuit 424 changes from 1 to 0 with a delay time $t_3$ ($t_3 > t_1$) relative to a change from 0 to 1 in the input applied to the input terminal by the lead 410a. The signals delivered from the NAND circuits 422 and 424 are applied by the respective leads 431 and 432 to an AND circuit 423 which takes the logical product of these two input signals. Thus, the signal appearing on an output lead 433 leading out from the output terminal of the AND circuit 423 changes from 0 to 1 with a delay time $t_1$ relative to a change from 0 to 1 in the input applied by the lead 410a and then changes from 1 to 0 with a delay time $t_2$ ($= t_3 - t_1$) as seen in FIG. 13.

NAND circuits 421', 422' and 424' and an AND circuit 423' in FIG. 12 constitute a timing control signal generating means which is entirely similar to that above described. Thus, the signal appearing on an output lead 433' leading out from the output terminal of the AND circuit 423' changes from 0 to 1 with a delay time $t_1'$ relative to a change from 0 to 1 in the input applied by the lead 410a and then changes from 1 to 0 with a delay time $t_2'$ as seen in FIG. 13.

An AND circuit 425 takes the logical product of the timing signal applied from the AND circuit 423 by the lead 433 and the input signal applied from the switching circuit ($\theta$) 271 by the lead 411a. Since the switching circuit ($\theta$) 271 delivers its output signal or 1 when the throttle opening is $S_{e(2)}$ and over, an output signal or 1 appears from the AND circuit 425 on an output lead 434 in response to the application of an input signal or 1 from the AND circuit 423 by the lead 433. No signal or 0 appears on the lead 411a when the throttle openning is less then $S_{e(2)}$, and thus no output signal or 0 appears on the lead 434 leading out from the AND circuit 425 irrespective of the application of 1 or 0 from the AND circuit 423. A NAND circuit 426 delivers an output signal or no output signal in response to the application of 0 or 1 by the lead 411a. An AND circuit 425' takes the logical product of the timing signal applied from the AND circuit 423' by the lead 433' and the signal applied from the NAND circuit 426 by a lead 435. When the throttle openning is less then $S_{e(2)}$, no signal or 0 appears on the lead 411a and the NAND circuit 426 applies its output signal to the AND circuit 425' which therefore delivers an output signal or 1 in response to the application of an input signal from the AND circuit 423' by the lead 433'. On the other hand, when the throttle openning is $S_{e(2)}$ and over, no output signal or 0 is delivered from the AND circuit 425' to appear on an output lead 436 irrespective of the application of 1 or 0 from the AND circuit 423'. An OR circuit 427 takes the logical sum of the input signals applied from the AND circuits 425 and 425' and delivers an output signal or 1 in response to the application of 1 from either AND circuit. Therefore, the input signal applied from the AND circuit 425 appears on an output lead 438a when the throttle opening is $S_{e(2)}$ and over, while the input signal applied from the AND circuit 425' appears on the output lead 438a when the throttle openning is less than $S_{e(2)}$. This means that the timing control signal can be selected by the throttle position signal which is one of the signals representative of the running conditions of the vehicle.

2 - 3 Upshift

The servo capacity control solenoid 162 is energized for a limited period of time during an upshift from the second to third speed, and the timing control circuit 420b delivers a timing control signal in a manner similar to that above described. The output signal 0 or 1 delivered from the switching circuit ($\theta$) 271 is applied to one of the input terminals of the timing control circuit 420b by a lead 411b, and the output signal from the 2 - 3 shift discriminating circuit 320 is applied by a lead 405 to a NAND circuit 401 from which an inverted signal is applied to the other input terminal of the timing control circuit 420b by a lead 410b. Therefore, the signal applied to the latter input terminal of the timing control circuit 420b by the lead 410b changes from 0 to 1 relative to a change from 1 to 0 in the input applied from the 2 - 3 shift discriminating circuit 320 during the 2 - 3 upshift, and a duty cycle signal appears on an output lead 438b of the timing control circuit 420b as in the case of the N (or P) - R shift. The AND circuit 442 takes the logical product of the 2 - 3 upshift timing control signal applied from the 2 - 3 upshift timing control circuit 420b by the lead 438b and the signal applied from the switching circuit (D) 273. Thus, a timing control signal appears on an output lead 443 of the AND circuit 442 only when the transmission shift lever is in the D position.

1 - 2 Upshift

During an upshift from the first to second speed too, the servo capacity control solenoid 162 is controlled in a manner similar to that above described. The 1 - 2 upshift timing control circuit 420c has a structure entirely similar to that of the n (or P) - R shift timing control circuit 420a and delivers a 1 - 2 upshift timing control signal. The output signal 0 or 1 delivered from the switching circuit ($\theta$) 271 is applied to one of the input terminals of the 1 - 2 upshift timing control circuit 420c by a lead 411c, and the output signal delivered from the 1 - 2 shift discriminating circuit (D) 300 is applied through the AND circuit 500 to a NAND circuit 402 by a lead 406 from which an inverted signal is applied to the other input terminal of the timing control circuit 420c by a lead 410c. Therefore, the signal applied to the latter input terminal of the timing control circuit 420c by the lead 410c changes from 0 to 1 relative to a change from 1 to 0 in the input applied from the 1 - 2 shift discriminating circuit (D) 300 during the 1 - 2 upshift, and a duty cycle signal appears on an output lead 438c of the timing control circuit 420c as in the case of the N (or P) - R shift. The OR circuit 444 takes the logical sum of the signals applied from the N (or P) - R shift timing control circuit 420a, the AND circuit 442 and the 1 - 2 upshift timing control circuit 420c by the respective leads 438a, 443 and 438c, and an output signal or 1 appears on an output lead 445 of the OR circuit 444 when 1 is applied from anyone of these circuits 420a, 442 and 420c. The output from the OR circuit 444 is amplified by the amplifier 480 to energize the servo capacity control solenoid 162.

The AND circuits, NAND circuits and OR circuits used in the timing control circuits described in detail hereinabove may be of well-known construction. In this manner, the servo capacity control solenoid 162 is subjected to on-off timing control suitable for the specific shift and running conditions of the vehicle during such shift and controls the rate of increase in the fluid pressure supplied to the hydraulic servos thereby controlling the engaging timing and the rate of engagement of the brake bands and clutches for ensuring a smooth shift.

The timing controller for controlling the operation of the servo capacity control solenoid 162 employed in the present invention has been so arranged that the preset throttle openning signal indicative of one of the running conditions of the vehicle is utilized to switch the timing control signal over two stages. However, where a more complex control is required, control means of a structure similar to that described may be additionally provided so as to switch the timing control signal over three or more stages. Further, this switch-over signal is not limited to the present throttle opening signal, and a signal representative of another running condition of the vehicle such as the vehicle speed or temperature of lubricating oil may be utilized in lieu thereof. Furthermore, although a simple timing control signal which changes merely from 0 to 1 and then from 1 to 0 has been described by way of example, this signal may change in a more complex manner when so required.

Figure 14:
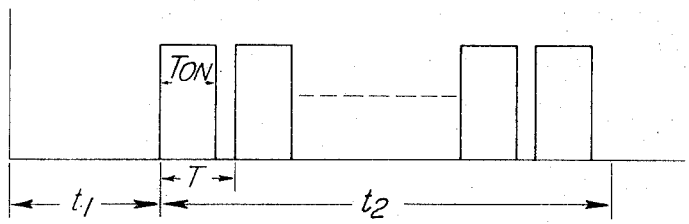
FIG. 14 shows the waveform of a signal applied to the solenoid operated servo capacity control valve for energizing same.
Figure 15:
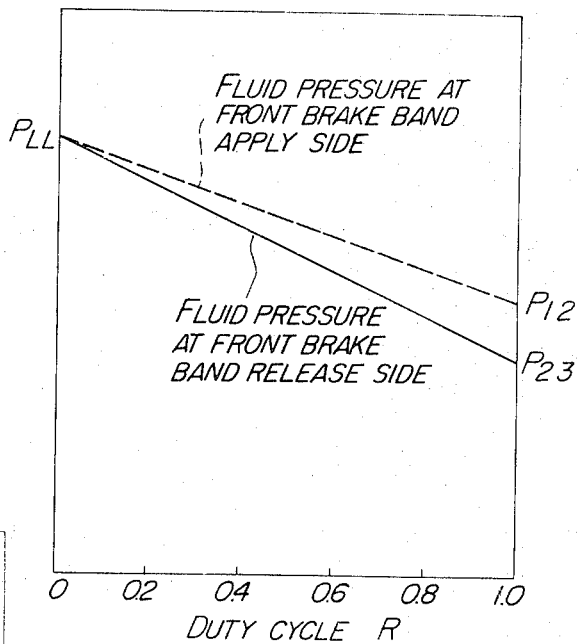
FIG. 15 is a graph showing the variation in the fluid pressure supplied to the hydraulic servo means relative to the duty cycle shown in FIG. 14.
Figure 15:
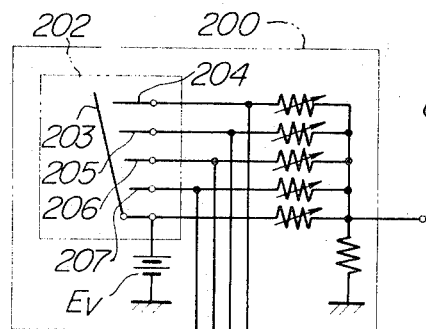

For example, the timing control signal may be an oscillating voltage having a suitable frequency as shown in FIG. 14, and its duty cycle R may be suitably varied depending on the running conditions of the vehicle so that the mean fluid pressure supplied to the hydraulic servo means can be regulated to a level suitable for ensuring smooth engagement. FIG. 15 shows the mean fluid pressure level relative to the duty cycle R shown in FIG. 14. The mean fluid pressure is equal to the line pressure $P_{LL}$ when $R = 0$, that is, when the servo capacity control solenoid 162 is kept de-energized. On the other hand, when $R = 1$, that is, when the servo capacity control solenoid 162 is kept continuously energized, the fluid pressure supplied to the apply side 22a of the servo for the front brake band 22 is $P_{12}$ which is determined by the diameter of the orifices 134a and 166, while the fluid pressure supplied to the release side 22b of the servo for the front brake band 22 and to the rear clutch servo chamber 7a is $P_{23}$ which is determined by the diameter of the orifices 126a and 165. In the range in which R takes an intermediate value between 0 and 1, the fluid pressure has an intermediate value which is dependent on the value of R.

Figure 16:
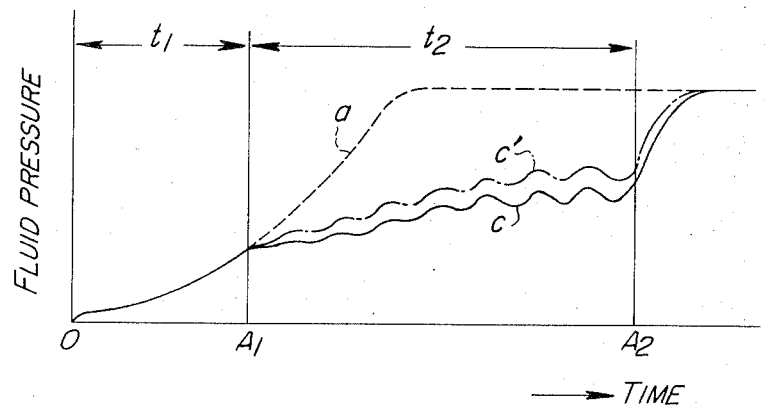
FIG. 16 is a chart similar to FIG. 4 but showing a different manner of fluid pressure control by the solenoid operated servo capacity control valve during a shift from the first to second speed.
Figure 17:
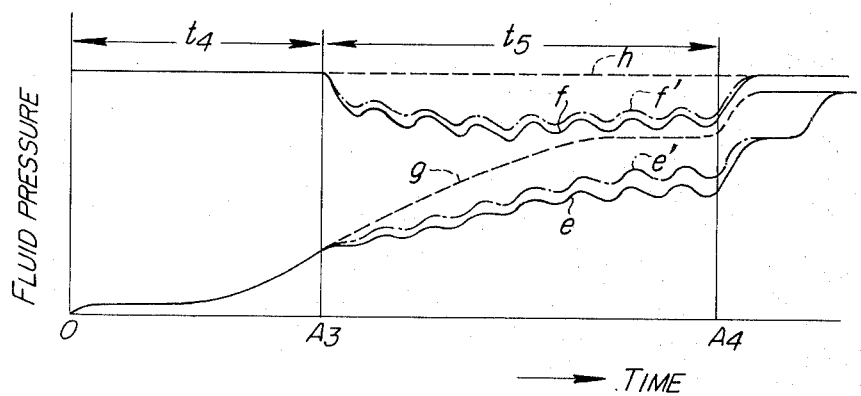
FIG. 17 is a chart similar to FIG. 5 but showing a different manner of fluid pressure control by the solenoid operated servo capcity control valve during a shift from the second to third speed.

FIG. 16 shows the manner of increase in the fluid pressure supplied to the apply side 22a of the servo for the front brake band 22 when the servo capacity control solenoid 162 is energized by such an oscillating voltage during an upshift from the first to second speed. The curve a respresents the rate of increase in the fluid pressure when the servo capacity control solenoid 162 is kept in its de-energized state or when the duty cycle $R = 0$. The curve c represents the rate of increase in the fluid pressure when an oscillating voltage having a relatively large duty cycle R is applied to the servo capacity control solenoid 162. The curve c' represents the rate of fluid pressure increase when an oscillating voltage having a smaller duty cycle R is applied to the servo capacity control solenoid 162. Similarly, FIG. 17 shows the manner of increase in the fluid pressure supplied to the release side 22b of the servo for the front brake band 22 and to the rear clutch servo chamber 7a when the servo capacity control solenoid 162 is energized by an oscillating voltage during an upshift from the second to third speed. The curves g and h represent the variation in the fluid pressure supplied to the rear clutch servo chamber 7a and to the release side 22b of the servo for the front brake band 22 respectively when the servo capacity control solenoid 162 is kept in its de-energized state or when the duty cycle $R = 0$. The curves e and f represent the variation in the fluid pressure supplied to the rear clutch servo chamber 7a and to the release side 22b of the servo for the front brake band 22 respectively when an oscillating voltage having a relatively large duty cycle R is applied to the servo capacity control solenoid 162. The curves e' and f' represent similar variations in the fluid pressure when an oscillating voltage having a smaller duty cycle R is applied to the servo capacity control solenoid 162. It will thus be seen that a more delicate control can be attained by applying an oscillating voltage to the servo capacity control solenoid 162 and suitably selecting the duty cycle R of such signal.

Figure 18:
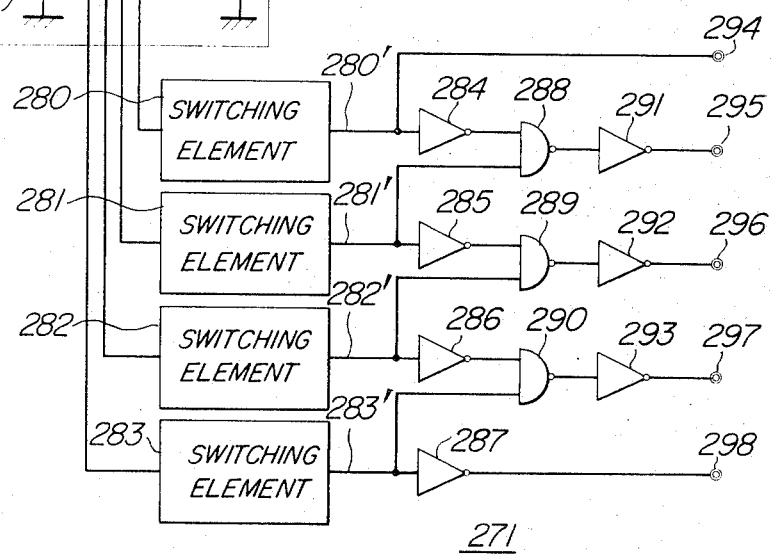
FIG. 18 is a circuit diagram showing the structure of another form of the throttle position detector which is connected to a switching circuit in the electrical control section.

Control means for applying such an oscillating voltage can be obtained by a partial modification of the electrical control section shown in FIG. 6. More precisely, the structure of the throttle position detector 200, switching circuit ($\theta$) 271, and timing control circuits 420a to 420c may be modified as described below. In FIG. 18, there is shown a modified throttle position detector 200 which is connected to a modified switching circuit ($\theta$) 271. The throttle position detector 200 shown in FIG. 18 is substantially the same as that shown in FIG. 7 except that an output lead is connected to each of the stationary contacts 204, 205, 206 and 207. The switching circuit ($\theta$) 271 is connected to the throttle position detector 200 by these leads and has five output terminals 294, 295, 296, 297 and 298 from which 1 or 0 appears depending on the throttle position. The switching circuit ($\theta$) 271 comprises four switching elements 280, 281, 282 and 283 which may be transistors and are connected to the respective stationary contacts 204, 205, 206 and 207 by the leads.

Each of the switching elements 280, 281, 282 and 283 is so aranged that 1 appears therefrom when the corresponding stationary contact is not in contact with the movable contact 203, while 0 appears therefrom when such stationary contact is in contact with the movable contact 203. Thus, when the throttle opening $S_e$ is less than $S_{e(1)}$, the movable contact 203 is not in contact with all the stationary contacts 204, 205, 206 and 207 and 1 appears on the output leads 280', 281', 282' and 283' of the respective switching elements 280, 281, 282 and 283. As the throttle opening $S_e$ is increased to an extent that it is more than $S_{e(1)}$ but less than $S_{e(2)}$, 0 appears on the output lead 280' only. When the throttle opening $S_e$ is more than $S_{e(2)}$ but less than $S_{e(3)}$, 0 appears on the output leads 280' and 281'. When the throttle valve is nearly full opened and the throttle opening $S_e$ exceeds $S_{e(4)}$, 0 appears on all the output leads 280', 281', 282' and 283'. A plurality of NOT circuits 284, 285, 286, 287, 291, 292 and 293, and a plurality of NAND circuits 288, 289 and 290 are provided for discriminating the throttle opening $S_e$ depending on the outputs from the four switching elements 280, 281, 282 and 283. Hence, 1 appears solely at the output terminal 294 and 0 appears at the other terminals 295, 296, 297 and 298 when $S_{e(0)}$ (full closed) $\leq S_e < S_{e(1)}$.

Similarly, 1 appears solely at the output terminal 295, at the output terminal 296, at the output terminal 297, and at the output terminal 298 when $S_{e(1)} \leq S_e < S_{e(2)}$, $S_{e(2)} \leq S_e < S_{e(3)}$, $S_{e(3)} \leq S_e < S_{e(4)}$, and $S_{e(4)} \leq S_e \leq$ full open, respectively. Thus, 1 appears from one of the five output terminals 294, 295, 296, 297 and 298 depending on the throttle position.

Figure 19:
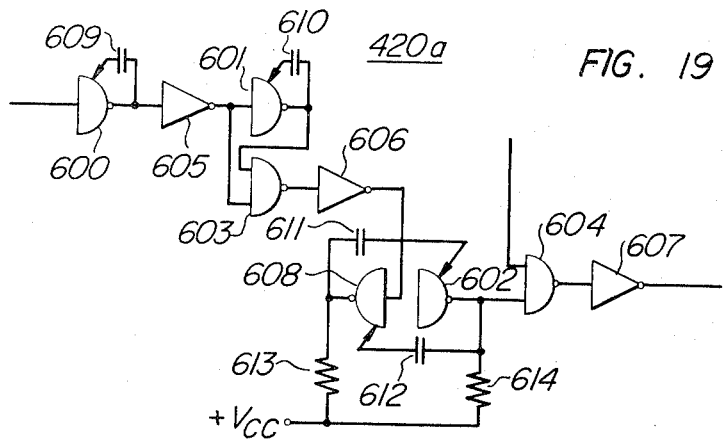
FIG. 19 is a circuit diagram showing the structure of another form of the timing control circuit in the electrical control section.

The timing control circuits 420a, 420b and 420c, for example, the N (or P) - R shift timing control circuit 420a may have a structure as shown in FIG. 19.

The switching circuit (R) 272 applies its output to one of the input terminals of the timing control circuit 420a by the lead 410a. As previously described, the switching circuit (R) 272 includes a switching element such as a transistor and is constructed so that it delivers an output signal or 1 when the shift lever is in the R position, while it delivers no output signal or 0 in any other positions of the shift lever. The output terminal 294 of the switching circuit ($\theta$) 271 is connected to another input terminal of the timing control circuit 420a by the lead 411a. Thus, when, for example, the throttle opening is $S_{e(0)} \leq S_e < S_{e(1)}$, 1 is applied from the output terminal 294 of the switch circuit ($\theta$) 271 to the timing control circuit 420a by the lead 411a. In any other throttle positions, 0 is applied to the timing control circuit 420a from the switching circuit ($\theta$) 271. The timing control circuit 420a includes a plurality of NAND circuits 600, 601, 602 and 608 each of which is provided with an expander terminal, a plurality of NAND circuits 603 and 604, and a plurality of NOT circuits 605, 606 and 607 as shown. A capacitor 609 is connected across the output terminal and the expander terminal of the NAND circuit 600 for the feedback of the output to the expander terminal of the NAND circuit 600 thereby constituting a delay means. The NAND circuit 601 is similarly associated with a feedback capacitor 610 for constituting a delay means. The NAND circuits 602 and 608 are associated with respective feedback capacitors 611 and 612 for constituting an astable multivibrator.

Figure 20:
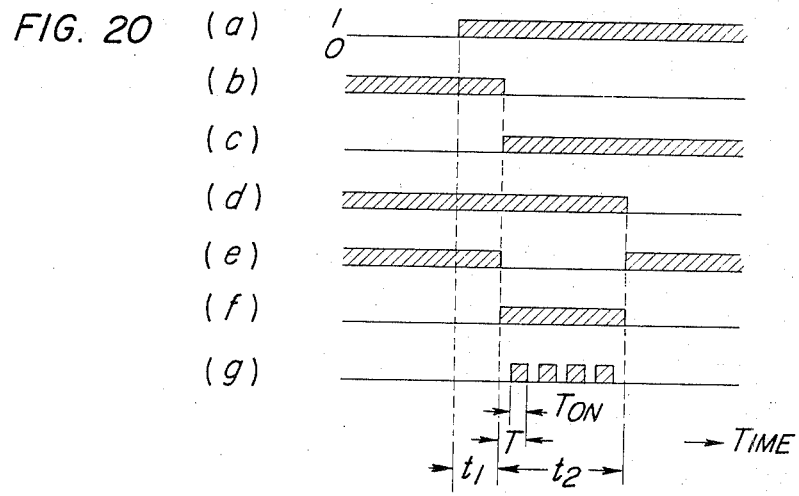
FIG. 20 is a chart illustrating the operation of the timing control circuit shown in FIG. 19.

The operation of the timing control circuit 420a shown in FIG. 19 will be described with reference to a signal chart shown in FIG. 20. In FIG. 20, the horizontal axis represents time and the vertical axis represents the signal waveforms (truth value) appearing at various parts of the timing control circuit 420a. The hatched portions in FIG. 20 show the state 1 and the remaining portions show the state 0.

When the throttle opening $S_e$ is more than $S_{e(1)}$, 0 is applied to the input lead 411a of the timing control circuit 420a, and 0 appears on an output lead 438a of the timing control circuit 420a irrespective of whatever value of the other input. On the other hand, when the transmission shift lever is shifted from the N position to the R position at time $t_0$ shown in FIG. 20 in the state in which 1 is applied to the timing control circuit 420a by the input lead 411a due to the fact that the throttle opening is less than $S_{e(1)}$, the input applied to the timing control circuit 420a by the lead 410a changes from 0 to 1 as shown in FIG. 20(a), and at this mement, the output from the NAND circuit 600 tends to change from 1 to 0. However, the output from the NAND circuit 600 remains to be 1 for a short period of time $t_1$ as shown in FIG. 20(b) due to the fact that the expander terminal of the NAND circuit 600 is kept at a negative potential for this period of time depending on the time constant which is determined by the internal resistance of the NAND circuit 600 and the capacitance of the capacitor 609. The output from the NAND circuit 600 is inverted by the NOT circuit 605 so that an input as shown in FIG. 20(c) is applied to the NAND circuits 601 and 603. The output from the NAND circuit 601 remains to be 1 for a period of time $t_2$, as shown in FIG. 20(d), which is determined by the capacitance of the capacitor 610 and the internal resistance of the NAND circuit 601 as in the case of the delay means constituted by the NAND circuit 600 having the feedback circuit including the capacitor 609. The NAND circuit 603 carries out the NAND operation on the inputs applied from the NOT circuit 605 and NAND circuit 601 and delivers an output in which 0 occurs for the period of time $t_2$ as seen in FIG. 20(e). The output from the NAND circuit 603 is inverted by the NOT circuit 606 which, therefore, delivers an output as shown in FIG. 20(f). During the period of time $t_1$ starting from the time $t_0$, 0 is applied from the NOT circuit 606 to the input terminal of the NAND circuit 608 which constitutes the astable multivibrator together with the NAND circuit 602 and associated feedback circuits. Thus, in response to the application of 0 from the NOT circuit 606, the NAND circuit 608 delivers 1 and the NAND circuit 602 delivers 0. When, subsequently, the input applied to the NAND circuit 608 changes from 0 to 1, the output from the NAND circuit 608 changes from 1 to 0 with a delay time (($T - T_{ON}$) shown in FIG. 20) which is determined by the capacitance of the capacitor 611, the resistance of a resistor 613 and the internal resistance of the NAND circuit 608 as in the case of the delay means constituted by the NAND circuit 600 having the feedback circuit including the capacitor 609. Therefore, the output from the NAND circuit 602 changes from 0 to 1 after a period of time $t_1 + (T - T_{ON})$ starting from the time $t_0$ as shown in FIG. 20. The duration $T_{ON}$ of 1 appearing from the NAND circuit 602 is determined by the capacitance of the capacitor 612, the resistance of a resistor 614 and the internal resistance of the NAND circuit 602 as in the case of the NAND circuit 608, and 1 of duration $T_{ON}$ appears repeatedly during the period of time $t_2$. After the period of time ($t_1 + t_2$) has elapsed starting from the time $t_0$, 0 is applied to the NAND circuit 608 again and the output from the NAND circuit 602 changes from 1 to 0 again. So long as 1 is applied continuously to the timing control circuit 420a by the lead 411a, the output from the NAND circuit 604 is dependent upon the output from the NAND circuit 602, and the output from the NAND circuit 602 appears on the output lead 438a as the output from the timing control circuit 420a. This output is shown in FIG. 20(g).

In FIG. 19, the resistors 613 and 614 are connected to the regulated power supply 700 shown in FIG. 6 to be applied with the power supply voltage +Vcc. While this voltage is applied to all of the NAND and NOT circuits shown in FIGS. 18 and 19, this power supply connection as well as the grounding connection is not shown in FIGS. 18 and 19 as is customary in the art.

The operation of the timing control circuit 420a will now be summarized. When the shift lever is shifted from the N or P position to the R position in the state in which the throttle opening is less than, for example, $S_{e(1)}$, a pulse signal, in which 1 and 0 occur repeatedly with a period T and with a duty cycle $T_{ON}/T$, appears on the output lead 438a during a period of time $t_2$ after a period of time $t_1$ has elapsed starting from time $t_0$. On the other hand, when the throttle opening is more than $S_{e(1)}$, 0 appears continuously on the output lead 438a. The periods of time $t_1$, $t_2$, $T_{ON}$ and T can be freely regulated by suitably selecting the capacitance of the capacitor 609, the capacitance of the capacitor 610, and the capacitances of the capacitors 611 and 612 and the resistances of the resistors 613 and 614.

It is apparent that the 2 - 3 upshift timing control circuit 420b and the 1 - 2 upshift timing control circuit 420c can be constructed by means similar to those employed in the N (or P) — R shift timing control circuit 420a.

Figure 21:
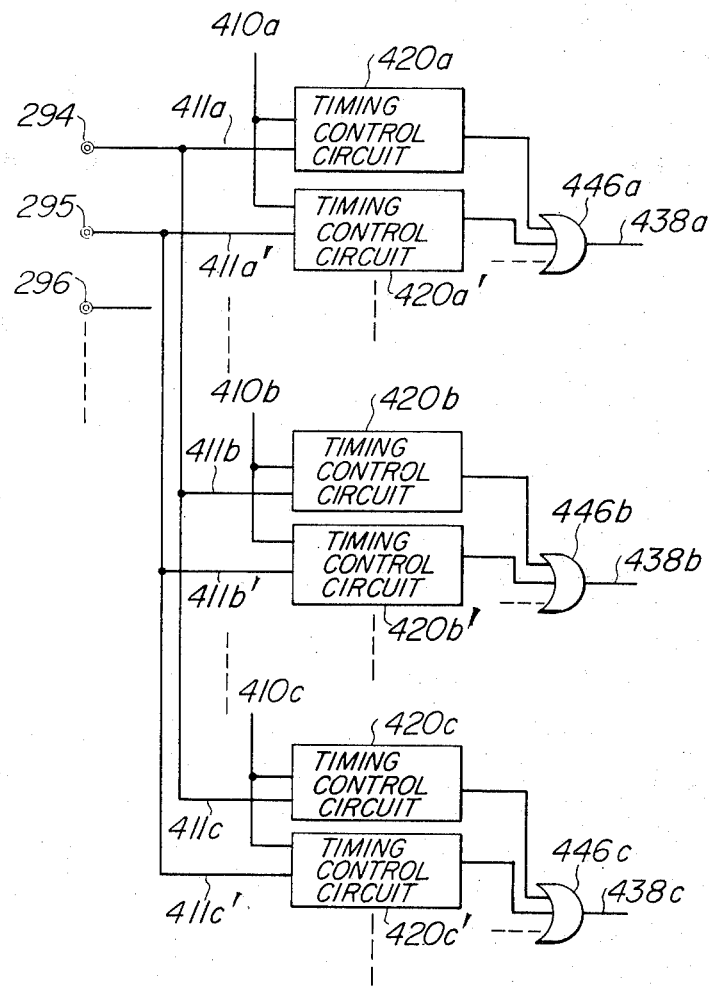
FIG. 21 is a circuit diagram of a timing controller consisting of a plurality of timing control circuits as shown in FIG. 19.

FIG. 21 shows a practical structure of the timing controller 420. It will be seen from FIG. 21 that the timing controller 420 comprises a plurality of N (or P) — R shift timing control circuits 420a, 420a', 420a'', ---, a plurality of 2 - 3 upshift control circuits 420b, 420b', 420b'', ---, and a plurality of 1 - 2 upshift timing control circuits 420c, 420c', 420c'', ---. Referring to FIG. 21, these N (or P) — R shift timing control circuits 420a, 420a', 420a'', --- are connected to the respective output terminals 294, 295, 296, 297 and 298 of the switching circuit (θ) 271 to receive the imputs therefrom, and their output terminals are connected through an OR circuit 446a to the output lead 438a so that the output from the entire N (or P) - R shift timing control system can appear on the output lead 438a. The 2 - 3 upshift timing control circuits 420b, 420b', 420b'', --- and the 1 - 2 upshift timing control circuits 420c, 420c', 420c'', --- are similarly arranged so as to carry out a more delicate timing control depending on the throttle opening.

Figure 22:
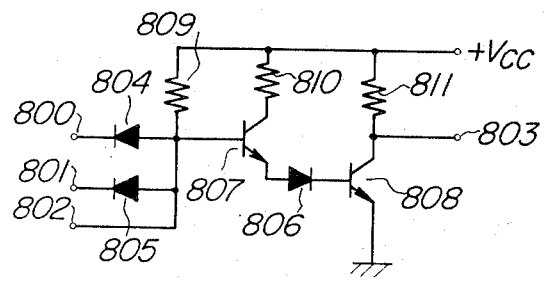
FIG. 22 is a circuit diagram showing a practical structure of electrical elements shown in FIGS. 18 and 19.

The NAND circuits and NOT circuits used in the timing control circuits described in detail hereinabove may be of well-known construction. As an example, so-called DTL (Diode-Transistor-Logic) elements having an internal structure as shown in FIG. 22 may be used to constitute the NAND and NOT circuits. Referring to FIG. 22, the DTL element comprises a plurality of input terminals 800, 801 and 802, an output terminal 803, input gate diodes 804 and 805, a level shift diode 806, transistors 807 and 808, resistors 809, 810 and 811 and a power supply terminal for supplying power at the power supply voltage +Vcc. When a positive voltage (which is commonly close to +Vcc) higher than the sum of the base-emitter forward voltage of the transistors 807 and 808 and the forward voltage of the diode 806 802, the transistor 807 conducts by being biased by the current supplied through the resistor 809, and the transistor 808 conducts also by being biased by the collector-emitter current of the transistor 807 with the result that the potential at the output terminal 803 drops to about the earth potential. Thus, 1 having appeared previously at the output terminal 803 is changed to 0. The NAND circuits 603 and 604 shown in FIG. 19 are those which are provided with a plurality of input terminals connected to gate diodes, such as the input terminals 800 and 801 connected to the respective gate diodes 804 and 805 shown in FIG. 22. The NAND circuits 600, 601, 602 and 608 provided with the expander terminal shown in FIG. 19 are those in which one of the input terminals is not connected to a gate diode, such as the input terminal 802 shown in FIG. 22. The NOT circuits 605, 606 and 607 shown in FIG. 19 are those which are provided with a single input terminal such as the input terminal 800 or 801 shown in FIG. 22 or those in which a plurality of input terminals are externally connected in common to be connected to a single gate diode.

What we claim is:

1. In an automatic transmission for an automotive vehicle for transmitting torque between a driving shaft and a driven shaft, a control system comprising:
    a plurality of frictional engaging means provided with fluid pressure operated servo means and arranged for the transmission of torque between said driving and driven shafts,
    a source of fluid pressure for supplying fluid under pressure for actuating said frictional engaging means,
    a plurality of shift valve means for selectively distributing fluid under pressure to said frictional engaging means,
    a plurality of fluid passage means leading from said shift valve means to said frictional engaging means,
    a servo capacity control valve means connected to said fluid passage means for allowing a portion of fluid under pressure to leak from said fluid passage means,
    signal generator means including at least a signal generator for generating an electrical output signal responsive to the running conditions of the vehicle, and
    means operable upon receipt of said output signal for controlling the operation of said servo capacity control valve means including means for producing at predetermined time points a second signal having a predetermined duration after the lapse of a predetermined length of time from the receipt of said output signal to cause said servo capacity control valve means to control the fluid pressure supplied to said frictional engaging means during a shift from one gear position to another which is followed by a variation in the drive ratio between said driving and driven shafts thereby ensuring a smooth transition from one gear position to another.

2. In an automatic transmission for an automotive vehicle for transmitting torque between a driving shaft and a driven shaft, a control system comprising a first frictional engaging means provided with a fluid pressure operated servo means for establishing a high speed drive ratio between said driving and driven shafts, a second frictional engaging means provided with a fluid pressure operated servo means having an apply-side servo chamber and a release-side servo chamber for establishing a low speed drive ratio between said driving and driven shafts, a source of fluid pressure for supplying fluid under pressure for actuating said frictional engaging means, a plurality of shift valve means for selectively distributing fluid under pressure to said frictional engaging means, a first fluid passage means leading from one of said shift valve means to the apply-side servo chamber of said fluid pressure operated servo means for said second frictional engaging means, a second fluid passage means leading from another said shift valve means to the fluid pressure operated servo means for said first frictional engaging means and to the releaseside servo chamber of said fluid pressure operated servo means for said second frictional engaging means, a servo capacity control valve means connected to said first and second fluid passage means for allowing a portion of fluid under pressure to leak suitably from one or both of said fluid passage means thereby controlling the fluid pressure supplied to said frictional engaging means, signal generator means including at least a signal generator for generating an electrical signal responsive to the running conditions of the vehicle, and means for producing an oscillating signal having a variable duty cycle thereby controlling the operation of said servo capacity control valve means in response to the output signal delivered from said signal generator means, whereby said servo capacity control valve means controls the fluid pressure supplied to said frictional engaging means during a shift from one gear position to another which is followed by a variation in the drive ratio between said driving and driven shafts thereby ensuring a smooth transition from one gear position to another.

3. A control system for an automatic transmission as claimed in claim 2, in which said fluid passage means are supplied with fluid under pressure from said fluid pressure source through an orifice restricting the rate of fluid flow, and said servo capacity control valve means allows the leakage of fluid under pressure from said fluid passage means through an orifice restricting the rate of leakage of fluid under pressure.

4. A control system for an automatic transmission as claimed in claim 3, in which said means for controlling the operation of said servo capacity control valve means comprises a delay circuit and a logic circuit and generates a timing control signal during a shift from one gear position to another for actuating said servo capacity control valve means electrically during the shift.

5. In an automatic transmission for an automotive vehicle for transmitting torque between a driving shaft and a driven shaft, a control system comprising:
a plurality of frictional engaging means provided with fluid pressure operated servo means and arranged for the transmission of torque between said driving and driven shafts,
a source of fluid pressure for supplying fluid under pressure for actuating said frictional engaging means,
a plurality of shift valve means for selectively distributing fluid under pressure to said frictional engaging means,
a plurality of fluid passage means leading from said shift valve means to said frictional engaging means, a servo capacity control valve means connected to said fluid passage means for allowing a portion of fluid under pressure to leak from said fluid passage means,
signal generator means including at least a signal generator for generating an electrical signal responsive to the running conditions of the vehicle, and
means for controlling the operation of said servo capacity control valve means and for producing a signal at predetermined time points in response to the output signal delivered from said signal generator means, whereby said servo capacity control valve means controls the fluid pressure supplied to said frictional engaging means during a shift from one gear position to another which is followed by a variation in the drive ratio between said driving and driven shafts thereby ensuring a smooth transition from one gear position to another,
in which said means for controlling the operation of said servo capacity control valve means produces an oscillatory signal having a variable duty cycle.

6. In an automatic transmission for an automotive vehicle for transmitting torque between a driving shaft and a driven shaft, a control system comprising:
a first frictional engaging means provided with a fluid pressure operated servo means for establishing a high speed drive ratio between said driving and driven shafts,
a second frictional engaging means provided with a fluid pressure operated servo means having an apply-side servo chamber and a release-side servo chamber for establishing a low speed drive ratio between said driving and driven shafts,
a source of fluid pressure for supplying fluid under pressure for actuating said frictional engaging means,
a plurality of shift valve means for selectively distributing fluid under pressure to said frictional engaging means,
a first fluid passage means leading from one of said shift valve means to the apply-side servo chamber of said fluid pressure operated servo means for said second frictional engaging means,
a second fluid passage means leading from another said shift valve means to the fluid pressure operated servo means for said first frictional engaging means and to the release-side servo chamber of said fluid pressure operated servo means for said second frictional engaging means,
a servo capacity control valve means connected to said first and second fluid passage means for allowing a portion of fluid under pressure to leak suitably from one or both of said fluid passage means thereby controlling the fluid pressure supplied to said frictional engaging means,
signal generator means including at least a signal generator for generating an electrical signal responsive to the running conditions of the vehicle, and
means for producing a signal at predetermined time points for controlling the operation of said servo capacity control valve means in response to the output signal delivered from said signal generator means, whereby said servo capacity control valve means controls the fluid pressure supplied to said frictional engaging means during a shift from one gear position to another which is followed by a variation in the drive ratio between said driving and driven shafts thereby ensuring a smooth transition from one gear position to another.

7. A control system for an automatic transmission as claimed in claim 6, in which said fluid passage means are supplied with fluid under pressure from said fluid pressure source through an orifice restricting the rate of fluid flow, and said servo capacity control valve means allows the leakage of fluid under pressure from said fluid passage means through an orifice restricting the rate of leakage of fluid under pressure.

8. A control system for an automatic transmission as claimed in claim 6, in which said means for controlling the operation of said servo capacity control valve means comprises a delay circuit and a logic circuit and generates a timing control signal during a shift from one gear position to another for actuating said servo capacity control valve means electrically during the shift.

9. A control system for an automatic transmission as claimed in claim 6, in which said means for controlling the operation of said servo capacity control valve means produces an oscillatory signal having a variable duty cycle.

10. In an automatic transmission for an automotive vehicle for transmitting torque between a driving shaft and a driven shaft, a control system comprising:

a plurality of frictional engaging means provided with fluid pressure operated servo means and arranged for the transmission of torque between said driving and driven shafts, a source of fluid pressure for supplying fluid under pressure for actuating said frictional engaging means, a plurality of shift valve means for selectively distributing fluid under pressure to said frictional engaging means, a plurality of fluid passage means leading from said shift valve means to said frictional engaging means, a servo capacity control valve means connected to said fluid passage means for allowing a portion of fluid under pressure to leak from said fluid passage means, signal generator means including at least a signal generator for generating an electrical signal responsive to the running conditions of the vehicle, and means for producing an oscillatory signal having a variable duty cycle and controlling the operation of said servo capacity control valve means in response to the output signal delivered from said signal generator means, whereby said servo capacity control valve means controls the fluid pressure supplied to said frictional engaging means during a shift from one gear position to another which is followed by a variation in the drive ratio between said driving and driven shafts thereby ensuring a smooth transition from one gear position to the next.

* * * * *